US010616033B2

(12) United States Patent
Murrish

(10) Patent No.: US 10,616,033 B2
(45) Date of Patent: Apr. 7, 2020

(54) DIFFERENT PERSPECTIVES FROM A COMMON VIRTUAL ENVIRONMENT

(71) Applicant: Honda Motor Co., Ltd., Tokyo (JP)

(72) Inventor: Robert Wesley Murrish, Santa Clara, CA (US)

(73) Assignee: Honda Motor Co., Ltd., Tokyo (JP)

(*) Notice: Subject to any disclaimer, the term of this patent is extended or adjusted under 35 U.S.C. 154(b) by 250 days.

(21) Appl. No.: 15/804,530

(22) Filed: Nov. 6, 2017

(65) Prior Publication Data
US 2019/0140885 A1    May 9, 2019

(51) Int. Cl.
| | |
|---|---|
| *H04L 29/06* | (2006.01) |
| *G06T 19/00* | (2011.01) |
| *A63F 13/847* | (2014.01) |
| *G06F 3/0481* | (2013.01) |
| *G06F 3/01* | (2006.01) |
| *G06T 13/40* | (2011.01) |

(52) U.S. Cl.
CPC ...... *H04L 29/06034* (2013.01); *A63F 13/847* (2014.09); *G06F 3/011* (2013.01); *G06F 3/04815* (2013.01); *G06T 13/40* (2013.01); *G06T 19/003* (2013.01); *G06T 19/006* (2013.01); *H04L 67/38* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 6,348,927 B1* | 2/2002 | Lipkin | H04L 67/02 345/619 |
| 6,379,249 B1 | 4/2002 | Satsukawa et al. | |
| 8,489,119 B1 | 7/2013 | Fraccarili | |
| 8,913,009 B2 | 12/2014 | Takeda et al. | |
| 9,104,539 B2* | 8/2015 | Fujimoto | G11C 5/00 |

(Continued)

FOREIGN PATENT DOCUMENTS

JP    11169557    6/1999

*Primary Examiner* — Todd Buttram
(74) *Attorney, Agent, or Firm* — Rankin, Hill & Clark LLP

(57) ABSTRACT

According to one or more aspects, systems and methods for providing different virtual environment perspectives based on a common virtual environment are described herein. A virtual environment model associated with a virtual environment, including a first virtual object associated with virtual environment coordinates, a first set of functions corresponding to a first virtual environment mode, and a second set of functions corresponding to a second virtual environment mode may be stored on a database. A virtual environment engine may generate a first virtual environment view of the first virtual object based on the first virtual environment mode and generate a second virtual environment view of the first virtual object based on the second virtual environment mode. The first virtual environment view and the second virtual environment view are respectively rendered on different devices in a concurrent fashion.

20 Claims, 20 Drawing Sheets

(56) References Cited

U.S. PATENT DOCUMENTS

| | | | |
|---|---|---|---|
| 9,230,367 B2 | 1/2016 | Stroila | |
| 9,285,871 B2 | 3/2016 | Geisner et al. | |
| 9,530,232 B2 | 12/2016 | Maciocci et al. | |
| 9,996,981 B1* | 6/2018 | Tran | A43D 1/025 |
| 10,339,721 B1* | 7/2019 | Dascola | G06T 19/006 |
| 10,341,424 B1* | 7/2019 | Mendes da Costa | |
| 2003/0174178 A1 | 9/2003 | Hodges | |
| 2008/0081701 A1* | 4/2008 | Shuster | A63F 13/30 463/42 |
| 2011/0223996 A1* | 9/2011 | Yerli | A63F 13/843 463/36 |
| 2014/0368534 A1* | 12/2014 | Salter | G06T 19/006 345/619 |
| 2015/0006752 A1* | 1/2015 | O'Hare | H04L 65/4069 709/231 |
| 2015/0106767 A1* | 4/2015 | Abercrombie | G06F 3/013 715/848 |
| 2015/0258434 A1* | 9/2015 | Scott | A63F 13/235 463/39 |
| 2016/0175715 A1* | 6/2016 | Ye | A63F 13/58 715/757 |
| 2016/0210780 A1* | 7/2016 | Paulovich | G06T 7/73 |
| 2016/0253843 A1* | 9/2016 | Lee | G06F 3/04815 345/633 |
| 2016/0253844 A1* | 9/2016 | Petrovskaya | G06Q 50/01 345/633 |
| 2016/0300388 A1 | 10/2016 | Stafford et al. | |
| 2017/0048337 A1 | 2/2017 | Fraccaroli | |
| 2017/0354875 A1* | 12/2017 | Marks | A63F 13/213 |

* cited by examiner

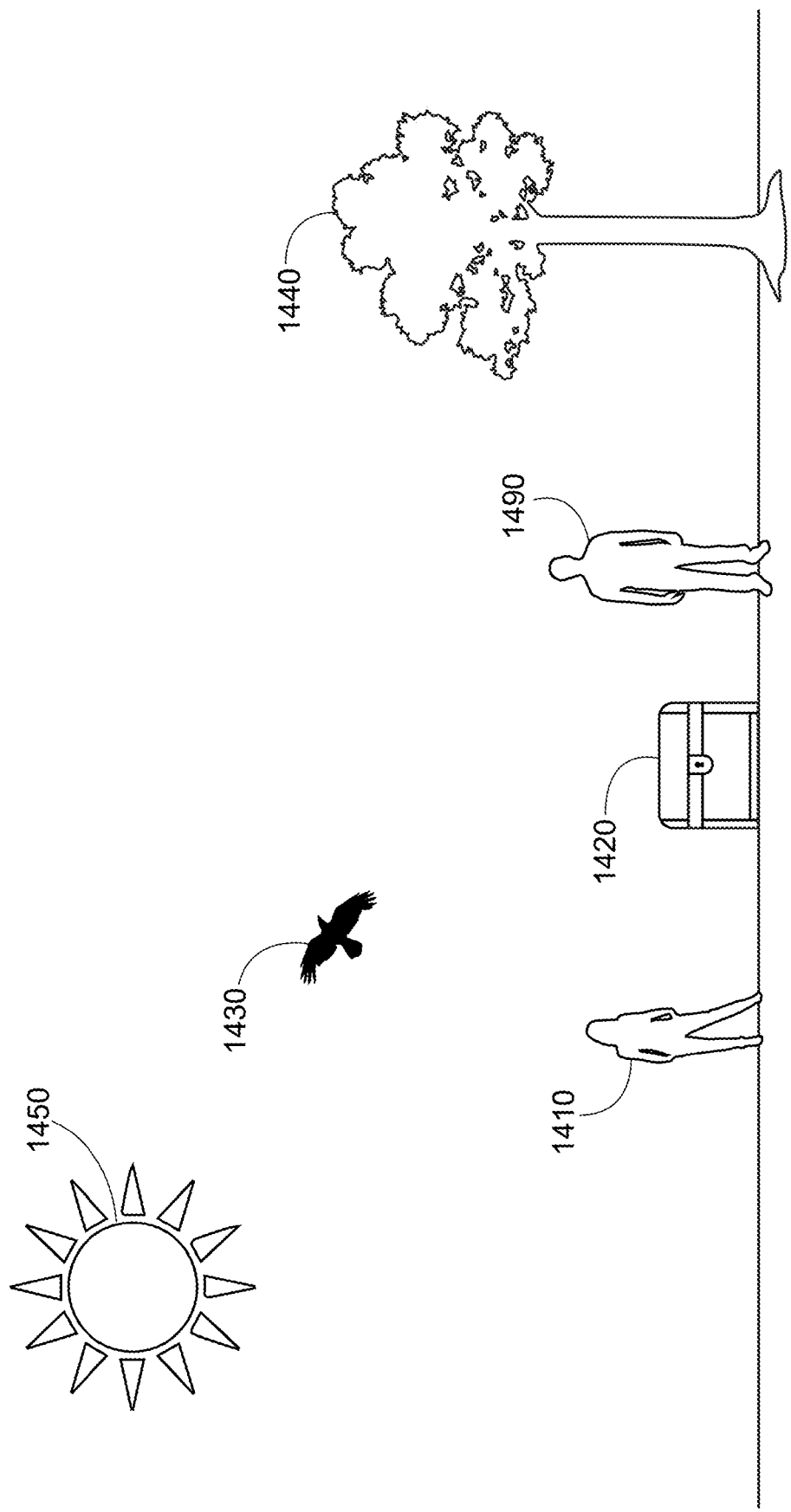

DIFFERENT PERSPECTIVES FROM A COMMON VIRTUAL ENVIRONMENT

BACKGROUND

Truly immersive virtual reality and augmented reality systems may create environments that submerge the perceptual system of a user in computer-generated stimuli (e.g., a virtual world or a virtual environment view). Typically, these immersive systems may captivate the senses of the user while blocking out stimuli from the physical world. The virtual world may be altered as a result of an input from the user and/or an interaction of the user with the virtual world.

Although, a goal of these systems is to create an immersive environment, the physical world may still be used to provide a context for the immersive environment. In particular, it may be important to consider the environment and context of the user. For example, in the context of the user in a vehicle, immersive virtual reality and augmented reality systems may consider information about the user, the vehicle, and the user in relation to the vehicle. This information may be used to generate an immersive environment that is customized to the user and the user's environment and may allow the user to perceive the immersive environment comfortably.

BRIEF DESCRIPTION

According to one or more aspects, a system for providing different virtual environment perspectives based on a common virtual environment may include a database, a memory, and a processor including a virtual environment engine. The database may store a virtual environment model associated with a virtual environment, including a first virtual object associated with virtual environment coordinates, a first set of functions corresponding to a first virtual environment mode, and a second set of functions corresponding to a second virtual environment mode. The memory may store one or more instructions. The virtual environment engine of the processor may execute one or more of the instructions stored on the memory to generate a first virtual environment view of the first virtual object based on the first virtual environment mode and generate a second virtual environment view of the first virtual object based on the second virtual environment mode. The first virtual environment view and the second virtual environment view are respectively rendered concurrently on different devices. The first virtual object has a first rendering in the first virtual environment view and a second rendering in the second virtual environment view different than the first rendering.

The first virtual environment view of the first virtual object may be rendered on a first device and the second virtual environment view of the first virtual object may be rendered on a second device. The first device and the first virtual environment mode may be associated with a first type of user and the second device and the second virtual environment mode may be associated with a second type of user. The type of user may be defined based on demographics associated with a user or selections made by the user associated with game genre, a selected game, a selected avatar, game ratings, previous gameplay.

The first virtual object may be a first user. The first rendering of the first user may be rendered with a first skin and the second rendering of the first user may be rendered with a first skin. The first set of functions may include a first dialogue function and the second set of functions may include a second dialogue function. The first virtual environment mode and the second virtual environment mode may be virtual environment mode datatypes. The database may store a view class node including functions for generating the first virtual environment view or the second virtual environment view based on the first virtual environment mode and the second virtual environment mode, respectively, as the virtual environment mode datatypes.

The virtual environment may include a second virtual object associated with virtual environment coordinates, a first set of functions corresponding to the first virtual environment mode, and a second set of functions corresponding to the second virtual environment mode. The virtual environment engine or the processor may generate the first virtual environment view of the second virtual object based on the first virtual environment mode and generate the second virtual environment view of the second virtual object based on the second virtual environment mode. The first virtual environment view and the second virtual environment view of the second virtual object may be respectively rendered concurrently on the different devices. The second virtual object may be a non-playable character.

The first set of functions may have a one-to-one trigger correspondence with the second set of functions. The first set of functions may have a one-to-one animation correspondence with the second set of functions. The first set of functions may have a one-to-one argument correspondence with the second set of functions.

According to one or more aspects, a system for providing different virtual environment perspectives based on a common virtual environment may include a database, a memory, and a processor including a virtual environment engine. The database may store a virtual environment model associated with a virtual environment, including a virtual object associated with virtual environment coordinates, a first function corresponding to a first virtual environment mode, and a second function corresponding to a second virtual environment mode. The memory may store one or more instructions. The virtual environment engine of the processor may execute one or more of the instructions stored on the memory to generate a first virtual environment view of the virtual object based on a first virtual environment skin of the first virtual environment mode and generate a second virtual environment view of the virtual object based on a second virtual environment skin of the second virtual environment mode different than the first virtual environment skin. The first virtual environment view and the second virtual environment view may be rendered concurrently on different devices.

The first virtual environment skin of the first virtual environment view of the virtual object may be associated with a first size and the second virtual environment skin of the second virtual environment view of the virtual object may be associated with a second size different than the first size.

According to one or more aspects, a system for providing different virtual environment perspectives based on a common virtual environment may include a database, a memory, a first device, and a second device. The database may store a virtual environment model associated with a virtual environment, including a virtual object associated with virtual environment coordinates, a first function corresponding to a first virtual environment mode, and a second function corresponding to a second virtual environment mode. The memory may store one or more instructions. The first device may include a virtual environment engine executing one or more of the instructions stored on the memory to perform rendering a first virtual environment view of the virtual object based on the first virtual environment mode. The second device may include a virtual environment engine executing one or more of the instructions stored on the memory to perform rendering a second virtual environment view of the virtual object based on the second virtual environment mode. The first virtual environment view and the second virtual environment view may be rendered concurrently by respective devices. The virtual object may be rendered as a first object in the first virtual environment view and rendered as a second object in the second virtual environment view different than the first object.

The first device may be associated with a first input and a second input. The second device may be associated with a first input and a second input. Receipt of the first input at the first device may trigger the first function and receipt of the first input at the second device may trigger the second function. The first function and second function may have corresponding animations.

BRIEF DESCRIPTION OF THE DRAWINGS

FIGS. 14A-B are exemplary first and second virtual environment views of a common virtual environment, according to one or more aspects.

DETAILED DESCRIPTION

Figure 1:
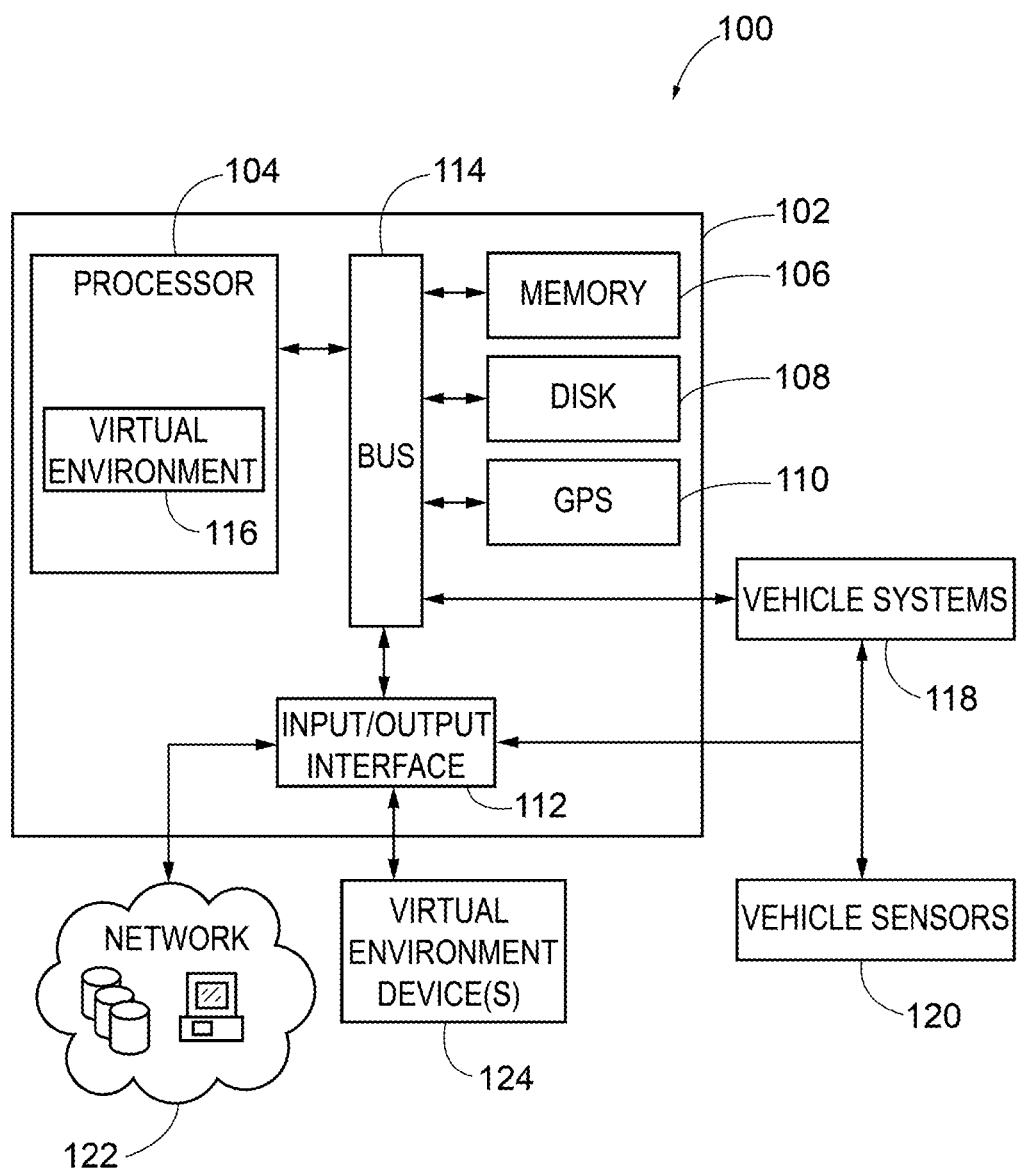
FIG. 1 is a schematic view of an exemplary operating environment for a system for providing different virtual environment perspectives based on a common virtual environment, according to one or more aspects.

FIG. 1 is a schematic view of an exemplary operating environment for a system 100 for providing different virtual environment perspectives based on a common virtual environment, according to one or more aspects. The system 100 for providing different virtual environment perspectives based on the common virtual environment may include a computing device 102. The computing device 102 may include a processor 104, a memory 106, a disk 108, a global positioning system (GPS) 110, an input/output interface 112, and a bus 114 interconnecting the respective components. The processor 104 may include a virtual environment engine 116. The disk 108 and the virtual environment engine 116 may be configured to present multiple virtual environment views to different users based on a single virtual environment stored on the disk 108. The memory 106 may store one or more instructions and the processor 104 or the virtual environment engine 116 thereof may execute one or more of the instructions stored on the memory 106 to perform generating one or more virtual environment views, as will be described herein. The system 100 may, depending on the operating environment, interface or communicate with other systems or components. For example, the system 100 may interface or communicate with one or more vehicle systems 118, one or more vehicle sensors 120, or communicate across a network 122 with other computing devices, such as servers.

Ultimately, one or more devices 124, such as a virtual reality headset, may receive a rendering feed from the virtual environment engine 116 of the system 100. In other embodiments, the virtual environment engine 116 may be located on one of the servers (not shown) across the network 122, and associated calculations or processing may be performed remotely. The device 124 may be a portable device (e.g., smartphone, etc.).

According to one or more aspects, the virtual environment may be generated based on a real world environment. For example, the vehicle sensors 120 may capture, detect, or sense one or more features from the real world environment and build the virtual environment accordingly, as will be described in greater detail in FIG. 12 herein.

Figure 2:
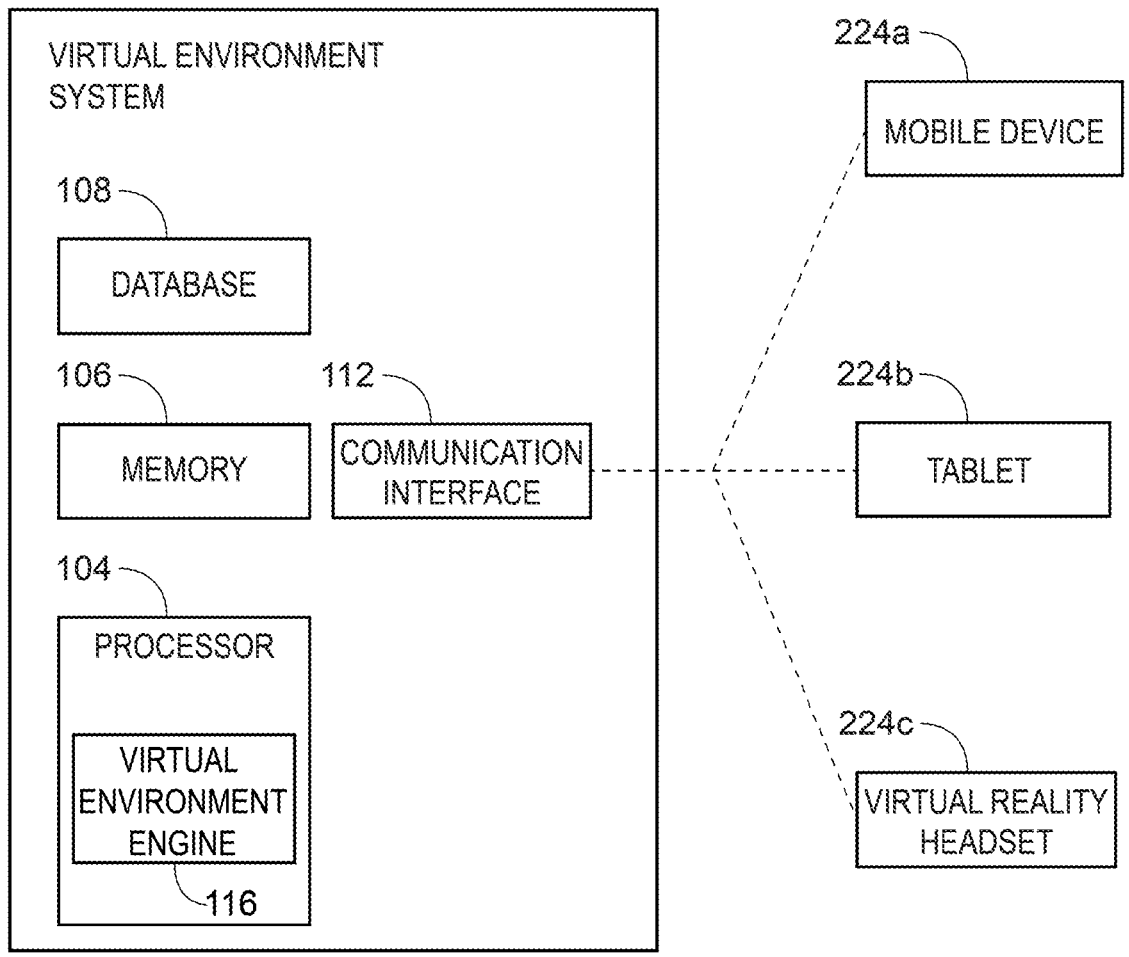
FIG. 2 is a schematic view of the system for providing different virtual environment perspectives based on the common virtual environment, according to one or more aspects.

FIG. 2 is a schematic view of the system 100 for providing different virtual environment perspectives based on the common virtual environment, according to one or more aspects. In FIG. 2, the system 100 includes the processor 104, which includes the virtual environment engine 116, the memory 106, a database 108 (e.g., embodied as the disk 108 in FIG. 1), and a communication interface 112 (e.g., embodied as the input/output interface 112 in FIG. 1). Through the communication interface 112, the system 100 may provide one or more rendering feeds to different devices. For example, a first device, such as a mobile device or smartphone 224a may receive a first rendering feed, a tablet 224b may receive a second rendering feed, and a virtual reality headset 224c may receive a third rendering feed from the virtual environment engine 116 of the system 100 via the communication interface 112. The devices 124 of FIG. 1 may include any of the smartphone 224a, the tablet 224b, or the virtual reality headset 224c of FIG. 2, among others. The rendering feeds may include one or more virtual environment views (e.g., one or more consecutively generated virtual environment views may form an animation for the rendering feed) generated by the virtual environment engine 116 of the processor 104.

Figure 3:
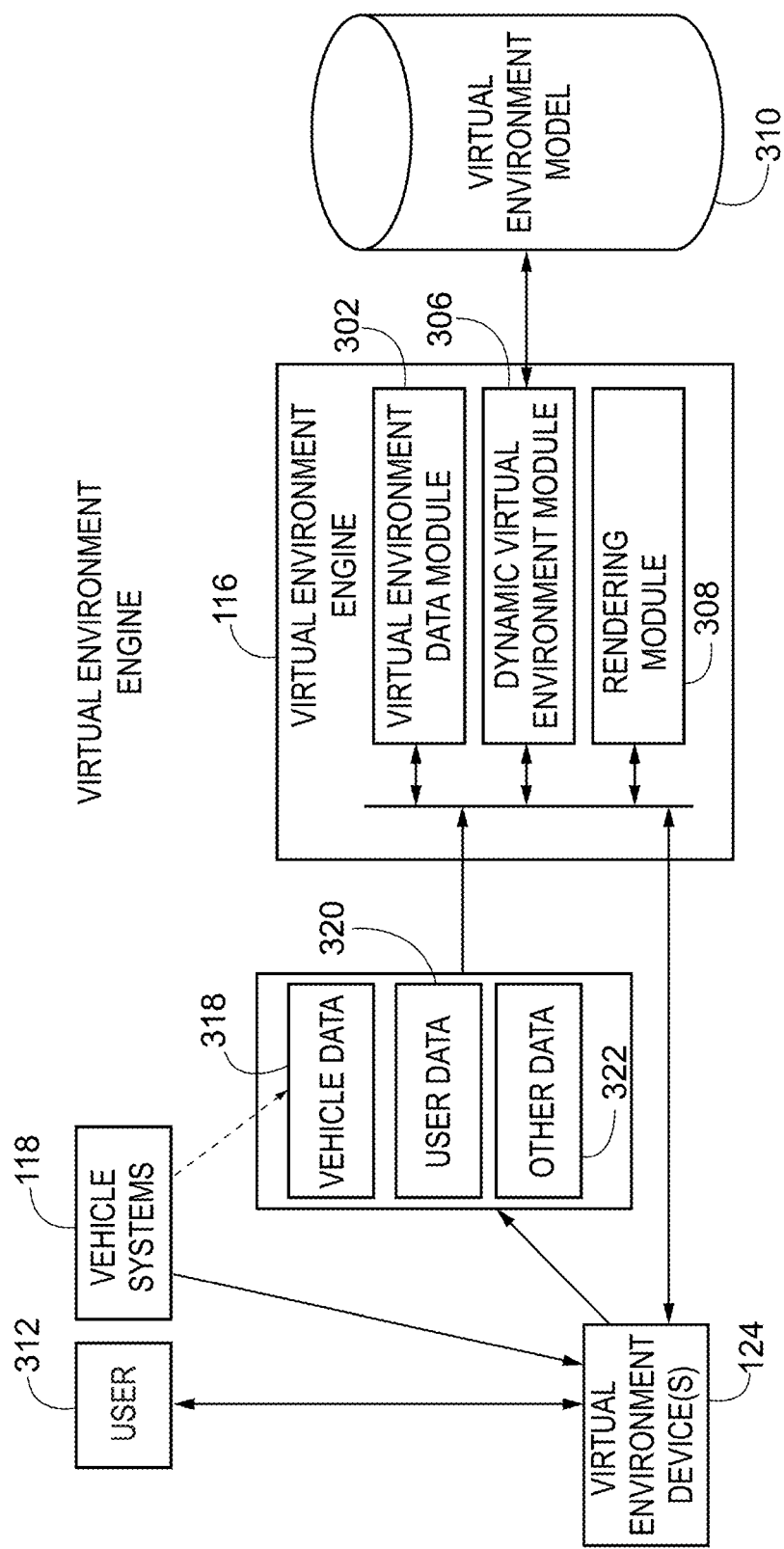
FIG. 3 is a block diagram of the exemplary virtual environment engine of FIG. 1, according to one or more aspects.

FIG. 3 is a block diagram of the exemplary virtual environment engine 116 of FIG. 1, according to one or more aspects. The virtual environment engine 116 may manage or generate data associated with a virtual environment. This data associated with the virtual environment may be referred to as a virtual environment model 310, and be stored on the database 108 of FIG. 2. Therefore, the database 108 may store the virtual environment or data associated therewith, such as the virtual environment model 310. The virtual environment model 310 may include one or more virtual objects (e.g., a first virtual object, a second virtual object, a third virtual object, etc.) associated with corresponding virtual environment coordinates. Each virtual object may be associated with different sets of functions, such as a first set of functions corresponding to a first virtual environment mode and a second set of functions corresponding to a second virtual environment mode. The first set of functions may include a first function and the second set of functions may include a second function. Thus, the first function may correspond to the first virtual environment mode and the second function may correspond to the second virtual environment mode.

For example, the first virtual object may be associated with virtual environment coordinates, a first set of functions corresponding to the first virtual environment mode, and a second set of functions corresponding to the second virtual environment mode. Similarly, the second virtual object may be associated with virtual environment coordinates, and a (e.g., its own) first set of functions corresponding to the first virtual environment mode, and a second set of functions corresponding to the second virtual environment mode.

Virtual objects may represent or be indicative of objects, people, or characters (e.g., other users or non-playable characters), and be associated with different sets of properties, characteristics, reactions, dialogue, etc. embodied through the different sets of functions or nodes associated with the virtual object.

The virtual environment engine 116 may generate different virtual environment views of the same virtual object based on the corresponding virtual environment mode, as will be described in greater detail herein. For example, the virtual environment engine 116 of the processor 104 may generate a first virtual environment view (e.g., first perspective) of the first virtual object based on the first virtual environment mode and a second virtual environment view (e.g., second perspective) of the first virtual object based on the second virtual environment mode. The virtual environment engine 116 may thus generate views for each virtual object within the virtual environment. As another example, the virtual environment engine 116 of the processor 104 may generate the first virtual environment view of the second virtual object based on the first virtual environment mode and generate the second virtual environment view of the second virtual object based on the second virtual environment mode.

Stated another way the virtual environment engine 116 of the processor 104 may generate the first virtual environment view of the virtual object based on a first virtual environment skin associated with the first virtual environment mode and generate the second virtual environment view of the virtual object based on a second virtual environment skin of the second virtual environment mode. The second virtual environment skin associated with the second virtual environment mode may be different than the first virtual environment skin. Further, the virtual environment skins may be associated with different virtual object properties.

Figure 8:
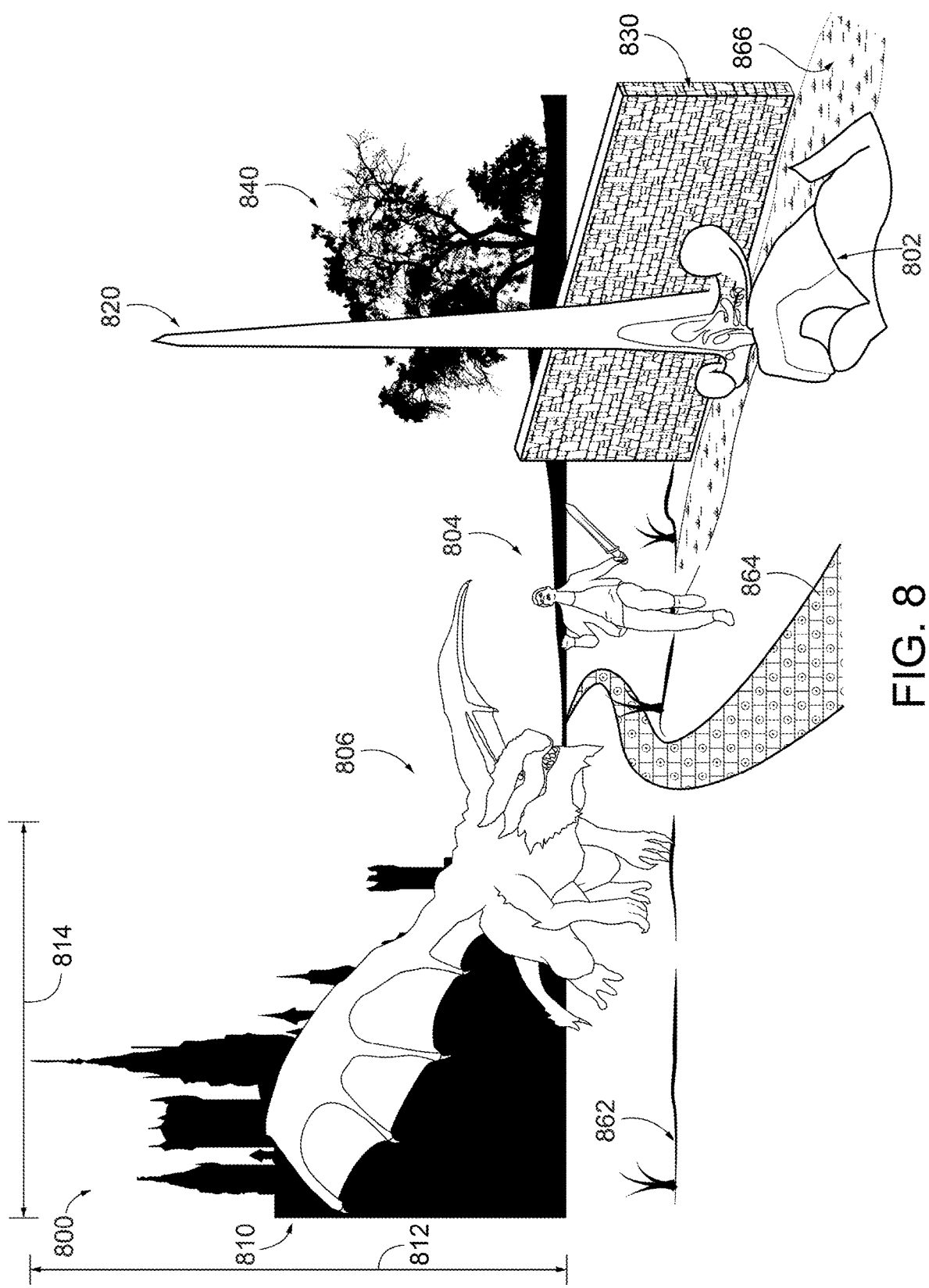
FIG. 8 is an exemplary first virtual environment view, according to one or more aspects.
Figure 9:
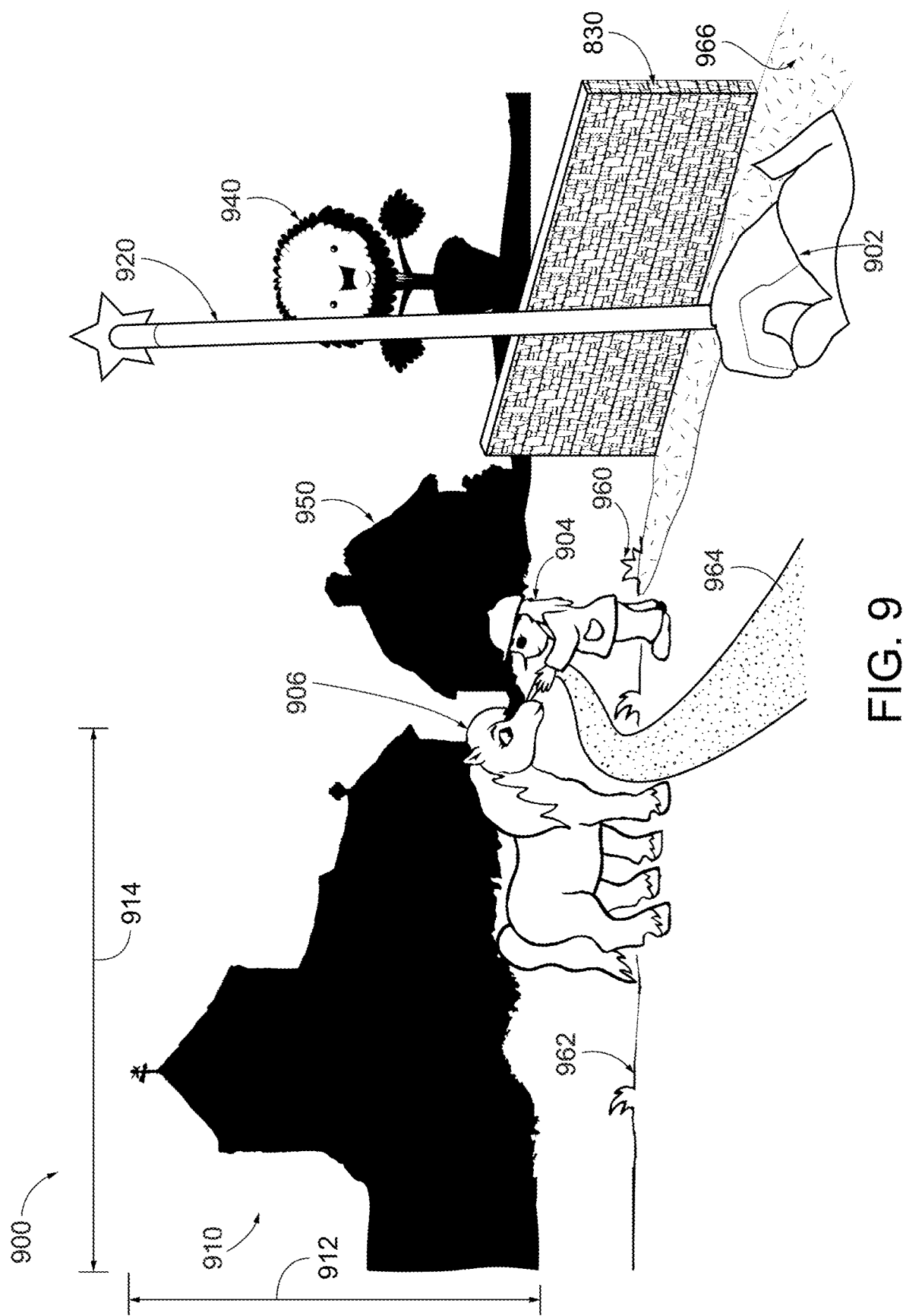
FIG. 9 is an exemplary second virtual environment view corresponding to the first virtual environment view of FIG. 8, according to one or more aspects.

For example, the first virtual environment skin for the virtual object may be associated with a first size, a first shape, a first color, etc. The second virtual environment skin of the second virtual environment view of the virtual object may be associated with a second size (which is different than the first size), a second shape (which is different than the first shape), a second color (which is different than the first color), etc. In any event, the perception, perspective, or view between different users is different when their respective virtual environment modes are different or have different values (e.g., the user 802 of FIG. 8 is experiencing a first mode and the user 902 of FIG. 9 is experiencing a second mode, as will be discussed in greater detail below).

In this way, a first user presented with the first virtual environment view experiences the first virtual object differently than a second user presented with the second virtual environment view, even though the two users are viewing the same virtual object (e.g., the first virtual object) from the same angle within the virtual environment, at the same time, using similar equipment, after providing correspondingly similar inputs (e.g., both users pressed an 'A' button), etc. Therefore, the virtual environment engine 116 (and modules thereof) may enable generation of multiple virtual environment views of the virtual environment which are perceived or seen differently by different users or virtual reality participants (e.g., a first user, who has made a first set of in game selections, experiencing the first mode and a second user, who has made a second set of in game selections different than the first set of in game selections, experiencing the second mode, or a young child experiencing a different mode than an older teenager). Each one of these users or participants experiences the virtual environment of the virtual environment model 310 from their own unique perspective or virtual environment view which is based on their associated virtual environment mode (e.g., determined on a user by user basis).

In other words, the first virtual environment view may be rendered on the smartphone 224a simultaneously or concurrently while the second virtual environment view is being rendered on the tablet 224b. In this way, the first virtual environment view and the second virtual environment view are respectively rendered in a concurrent fashion on the different devices 224a and 224b. Explained another way, the first virtual object has a first rendering in the first virtual environment view (e.g., for the first user) and a second rendering in the second virtual environment view different than the first rendering (e.g., for the second user), thereby providing both users with different experiences from the common virtual environment (e.g., associated with the same, common, or a single virtual environment model 310).

For example, the first virtual environment view of the first virtual object may be rendered on the smartphone 224a and the second virtual environment view of the first virtual object may be rendered on the tablet 224b.

The virtual environment model 310 stored on the database 108 may include data or instructions for generating one or more of the different virtual environment views (e.g., the first virtual environment view, the second virtual environment view . . . ) based on one or more of the different virtual environment modes (e.g., the first virtual environment mode, the second virtual environment mode . . . ). Although the following description and figures include two different virtual environment views associated with two different virtual environment modes (e.g., associated with distinct views, renderings, characteristics, properties, functions, users, among others), additional (e.g., a third, fourth, fifth . . . virtual environment mode) and virtual environment views are contemplated.

In any event, the smartphone 224*a* and the first virtual environment mode may be associated with a first type of user and the tablet 224*b* and the second virtual environment mode may be associated with a second type of user. A type of user (e.g., the first type of user, second type of user, etc.) may be defined by or based on demographics associated with a user 312, an account associated with the user 312, hardware (e.g., hardware of the smartphone 224*a* versus the hardware of the tablet 224*b*) associated with the user 312. Examples of demographics include age, sex, education level, income level, marital status, occupation, religion, among others. Additionally, the type of user may be defined by the virtual environment engine 116 based on, for example, one or more user selections. A user selection may be related to gameplay, but is not necessarily a direct selection of a game skin. For example, the user selection of a game genre, a game type, a selected game, a selected avatar, in game ratings, or previous gameplay may be used to influence whether the first virtual environment mode or the second virtual environment mode is used.

In this regard, if a user selects a first game, the first virtual environment mode may be applied and if the user selects a second game, the second virtual environment mode may be applied by the virtual environment engine 116. An example of different games (e.g., first and second games) will be described in FIGS. 14-16 below. Further, user reviews of previously played games may be utilized by the virtual environment engine 116 to determine a corresponding virtual environment mode. In other words, if the user leaves negative feedback associated with the first game, which is executed in association with the first virtual environment mode, selection of the same game in the future may result in execution of the second game, which is associated with the virtual environment mode, by the virtual environment engine 116. Similarly, selection of a first avatar may result in the use of the first virtual environment mode for that user, while selection of a second avatar may result in the use of the second virtual environment mode for that user. However, another user selecting the first avatar may experience the second virtual environment mode due to other user selections, such as a different game selection, for example.

In any event, the user 312 may experience the virtual environment view through the device(s) 124 based on input from the vehicle systems 118, the vehicle sensors 120, which may provide vehicle data 318, user data 320, or other data 322. The information from the vehicle systems 118 and the vehicle sensors 120 may be processed by the virtual environment engine 116 and received at a virtual environment data module 302 of the virtual environment engine 116. A dynamic virtual environment module 306 may generate the virtual environment view while a rendering module 308 may render the virtual environment view. In FIG. 3, the virtual environment engine 116 is a separate component from the device 124, and, for example, may be located on a vehicle.

In other embodiments, the device 124 may have its own virtual environment engine (e.g., 1320 of FIG. 13), and the processing, calculations, generating the virtual environment view, or rendering the virtual environment view may be divided or split between the virtual environment engine 116 and/or processor 104 of the system 100 or the vehicle and the virtual environment engine 1320 and/or processor 1324 of the device 124. For example, the generating of the virtual environment view may occur on the dynamic virtual environment module 306 of the virtual environment engine 116 of the system 100 (e.g., vehicle-side) and the rendering of the virtual environment view may occur on a rendering module of a virtual environment engine of the device 124 (e.g., virtual environment device-side, such as the virtual environment engine framework 1320 of FIG. 13).

Figure 4:
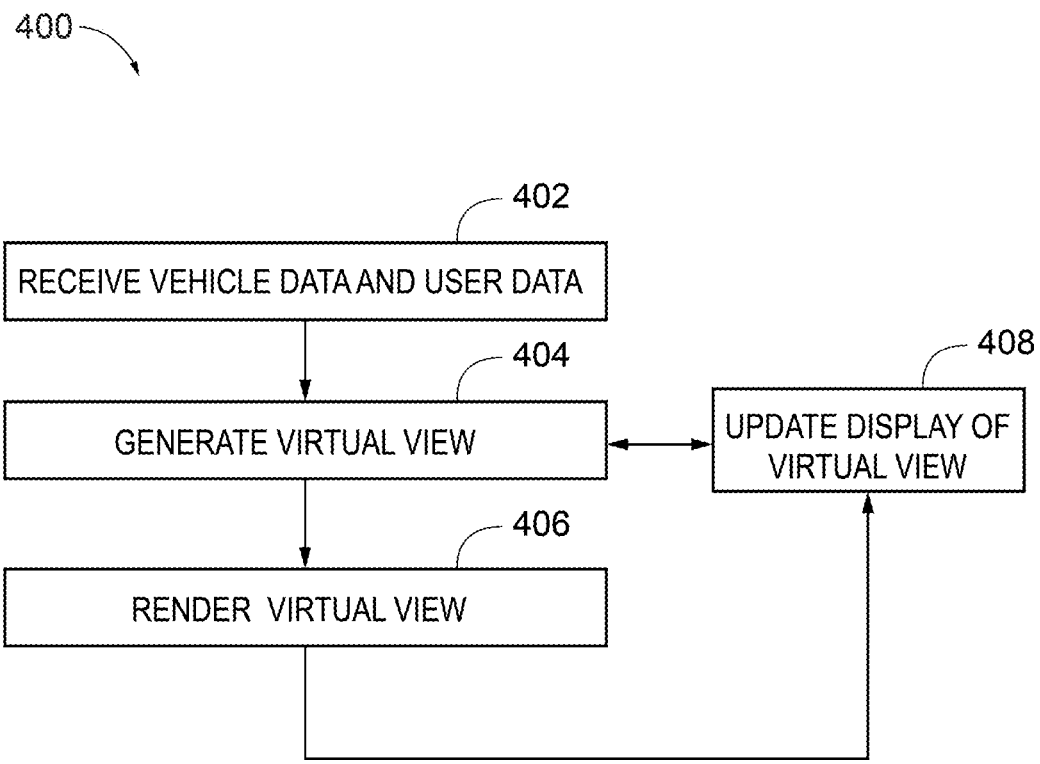
FIG. 4 is a flow diagram of an exemplary method for providing different virtual environment perspectives based on the common virtual environment, according to one or more aspects.

FIG. 4 is a flow diagram of an exemplary method 400 for providing different virtual environment perspectives based on the common virtual environment, according to one or more aspects. For example, the method may include receiving vehicle data and user data at 402. The user data may include the virtual environment mode, which is indicative of how the virtual environment is to be rendered or generated by the virtual environment engine 116. At 404, a virtual environment view may be generated based on the vehicle data and user data. At 406, the virtual environment view may be rendered based on the virtual environment mode. At 408, the virtual environment view may be updated and re-rendered.

Figure 5:
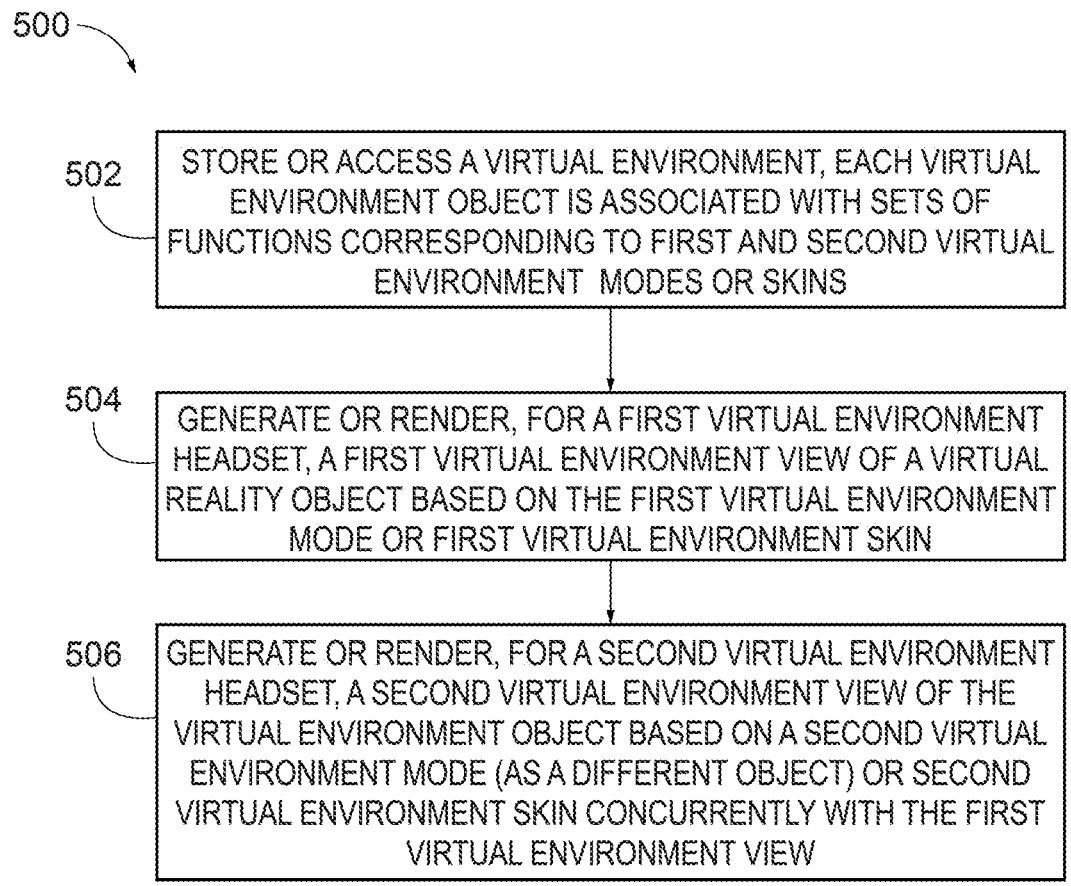
FIG. 5 is a flow diagram of an exemplary method for providing different virtual environment perspectives based on the common virtual environment, according to one or more aspects.

FIG. 5 is a flow diagram of an exemplary method 500 for providing different virtual environment perspectives based on the common virtual environment, according to one or more aspects. At 502, the method may include storing or accessing the virtual environment. Each virtual object may be associated with sets of functions corresponding to the first and second virtual environment modes or skins. At 504, the method may include generating or rendering, such as for the smartphone 224*a*, the first virtual environment view of the virtual object based on the first virtual environment mode or first virtual environment skin. At 506, the method may include generating or rendering, such as for the tablet 224*b*, the second virtual environment view of the virtual object based on the second virtual environment mode (as a different object) or second virtual environment skin concurrently with the first virtual environment view.

Figure 6:
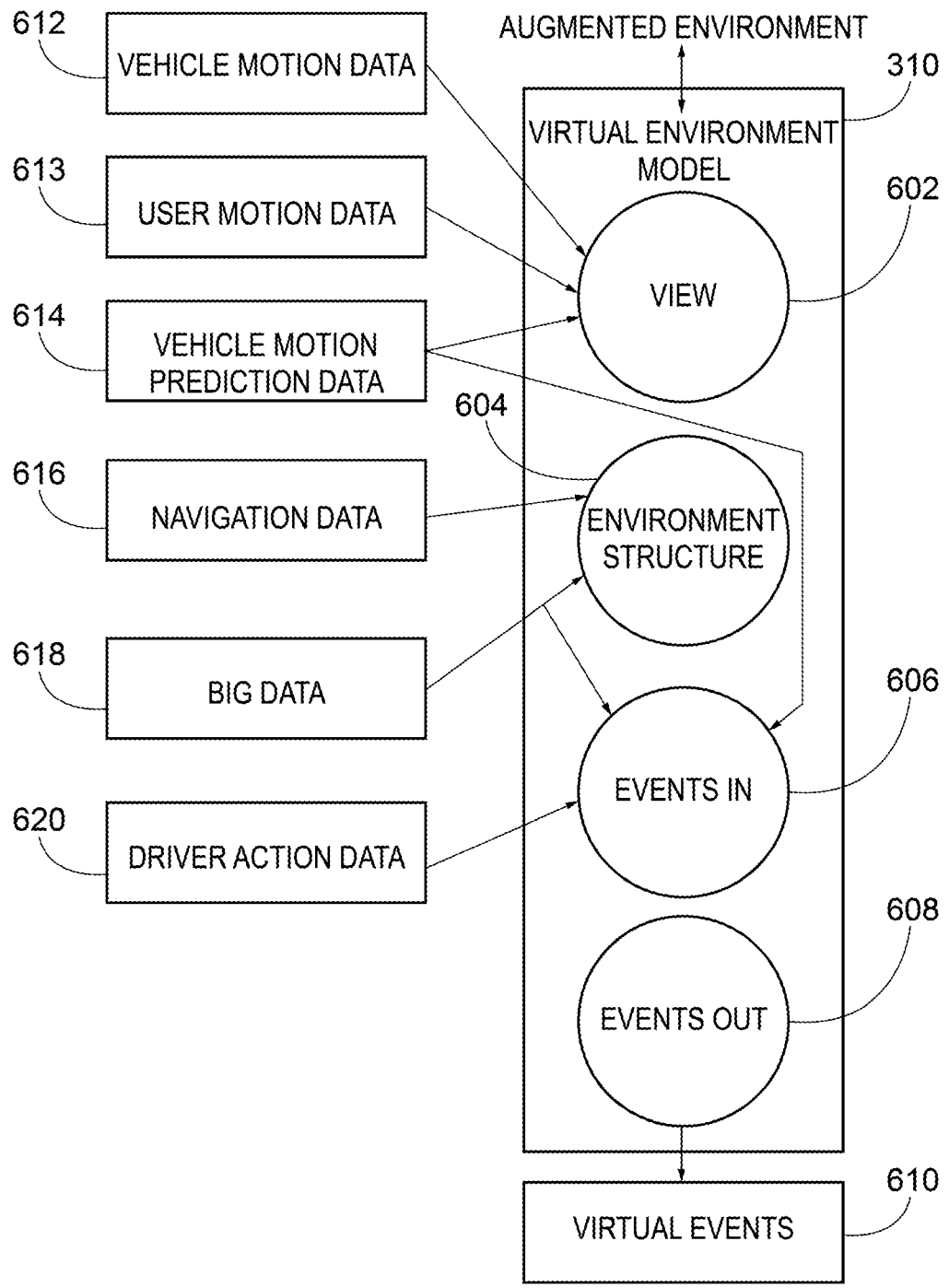
FIG. 6 is an exemplary virtual environment model diagram, including data flow, according to one or more aspects.
Figure 7:
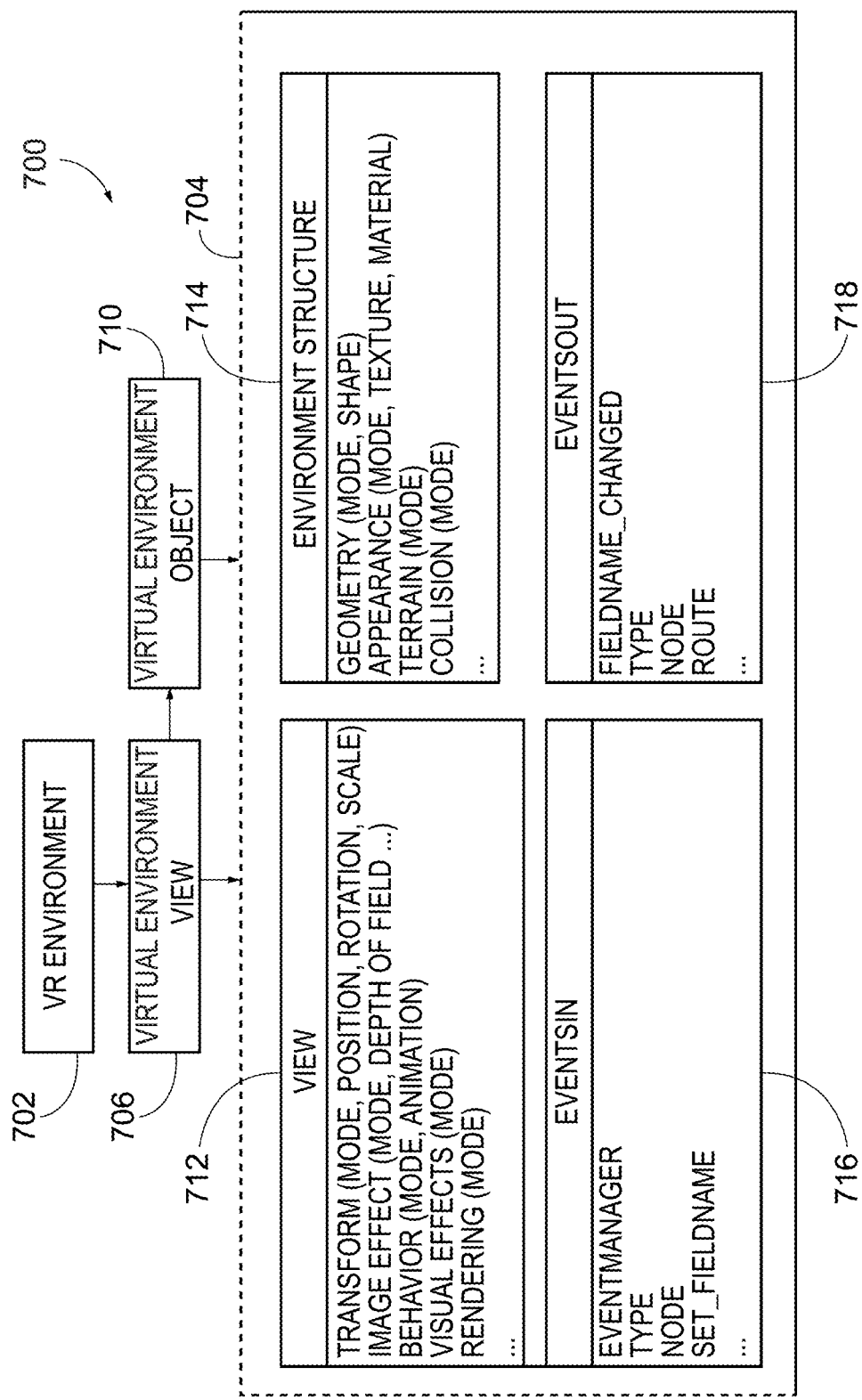
FIG. 7 is an exemplary schematic class diagram of a virtual environment including the virtual environment model of FIG. 6, according to one or more aspects.

FIG. 6 is an exemplary virtual environment model diagram, including data flow, according to one or more aspects. FIG. 7 is an exemplary schematic class diagram 700 of a virtual environment including the virtual environment model 310 of FIG. 6, according to one or more aspects. An exemplary virtual environment model 310 will now be described with reference to FIGS. 6-7. The class nodes, functions, objects, properties, references, methods, triggers, and events (e.g., the components that define the virtual environment view 706) discussed with reference to FIGS. 6-7 are exemplary in nature and are not intended to be limiting.

In FIG. 6, the virtual environment model 310 may include one or more components that define a virtual environment view 706. For example, in FIG. 6, the model includes a view class node 602, an environment structure class node 604, an eventsIn class node 606, and an eventsOut class node 608, which may cause the virtual environment engine 116 to output, generate, or render virtual events 610 or otherwise execute functions associated with one or more of the aforementioned class nodes 602, 604, 606, 608, etc. The class nodes in FIG. 6 may include similar methods, properties, fields, and references as the class nodes described with reference FIG. 7. FIG. 6 also illustrates exemplary data flow to the class nodes, for example, for augmenting the class nodes. Specifically, the dynamic virtual environment module 306 may use these types of data to augment specific class nodes.

As discussed in FIG. 3, the data may include vehicle data 318, user data 320, and/or other data 322. The types of data illustrated in FIG. 6 are types of vehicle data 318, user data 320, and/or other data 322 in FIG. 3. Specifically, in FIG. 6, the data includes, but is not limited to, vehicle motion data 612 (including vehicle dynamics data), user motion data 613, vehicle motion predictive data 614, navigation data 616, big data 618, and driver action data 620.

Generally, the virtual environment model 310 is a collection of many individual operations (e.g., functions or sets of functions) and virtual objects 710 that define the virtual environment 702 and at least two virtual environment views 706, each associated with a corresponding virtual environment mode. According to the present disclosure, each virtual object 710 is associated with two or more virtual environment views 706, which are rendered or generated by the virtual environment engine 116 depending on or based on a virtual environment mode passed (e.g., as an argument) to the virtual environment engine 116, node, or function. According to one or more aspects, the virtual environment mode may be of a numerical datatype (e.g., mode 1, mode 2, mode 3, etc.). For example, the virtual environment mode may include a first mode, a second mode, a third mode, etc. In other embodiments, the virtual environment mode may be its own datatype (e.g., a virtual environment mode datatype). For example, the virtual environment mode may include a first mode and a second mode. In another example, the virtual environment mode may include a toddler mode, a preschool mode, a grade schooler mode, a teen mode, a young adult mode, an adult mode, etc.

In any event, regardless of the specific mode, the name of the mode, or datatype used, the virtual environment engine 116 may generate (e.g., using the class nodes, nodes within the class nodes, functions within the class nodes, and the virtual environment mode as an input or as an argument) the virtual environment view 706 accordingly. Although the present disclosure describes the first mode and the second mode as examples (e.g., FIGS. 8 and 10 for the first mode and FIGS. 9 and 11 for the second mode), the list of modes provided herein is not intended to be limiting and other modes are contemplated.

The virtual environment model 310 may be defined using various modeling or programming languages, for example, virtual environment modeling language (VRML), DirectX, OpenGL, Unity, among others. As illustrated in FIG. 7, the virtual environment 702 may include one or more virtual environment views 706. The virtual environment 702 and the virtual environment views 706 may include one or more virtual objects 710. The virtual environment views 706 and the virtual objects 710 are defined by one or more class nodes, such as exemplary class nodes 704. According to one or more aspects, nodes may be grouped and applied to one or more virtual environment views 706 and/or virtual objects 710 in a hierarchy structure. For example, the group of class nodes 704 may apply to parent and child nodes of the virtual environment views 706 and/or virtual objects 710 associated with a particular group of nodes (e.g., the group of class nodes 704).

Each of the class nodes 704 may include components that define and/or modify the class nodes, such as, for example, other nodes, properties, fields, methods, functions, and/or references. According to one or more aspects, the nodes, properties, fields, methods, and/or references may be predefined based on the virtual environment 702 (e.g., for a particular theme, game, among others). Additionally, in other embodiments, the nodes, properties, fields, methods, and/or references may be predefined based on the user 312 or user preferences. Other class nodes, properties, fields, methods, and/or references not included in FIGS. 6-7 may be implemented and may be based on the different modeling and programming languages discussed herein.

In FIG. 7, the group of class nodes 704 includes a view class node 712, an environment structure class node 714, an eventsIn class node 716, and an eventsOut class node 718. According to one or more aspects, the virtual environment engine 116 of the processor 104 may generate a virtual environment view 706 based on the virtual environment model 310, virtual objects 710 represented within the virtual environment model 310, and the corresponding virtual environment mode. For example, these variables may be passed as arguments to the view class node 712.

The view class node 712 may include a function generating a view based on a virtual environment mode as an input variable or parameter passed, as arguments, to the nodes of the view class node 712. The view class node 712 may define a position and/or an orientation of the virtual environment view 706, the virtual object 710, functions, and/or operations associated with the virtual environment view 706 and/or the virtual object 710.

For example, in FIG. 7, the transform node may be used to perform geometric transformations and may include properties associated with position, rotation, and scale, which may be calculated based on the virtual environment mode as an argument to functions associated with the transform node. The imageEffect node may handle image post processing effects based on the virtual environment mode in a similar manner. Exemplary image post processing effects include, depth of field, motion, and blur, among others. The behavior node may be used to enable and disable different behaviors, such as, for example, animation and motion based on the virtual environment mode. The visualEffects node may be used to define visual effects, such as, for example, line renderers, halo effects, trail renders, among others based on the virtual environment mode. The rendering node may be used to define settings and components for rendering in-game and user interface elements based on the virtual environment mode.

For example, the environment structure class node 714 may include a function defining one or more aspects or characteristics of the view based on the virtual environment mode, as an argument to the function. For example, the texture of a given virtual object 710 may be defined differently based on the virtual environment mode (e.g., the first virtual environment mode, the second virtual environment mode, among others). Other properties defined by the environment structure class node 714 may include size, shape, appearance, texture, material, collision effects, transparency, existence, geometry, among others. For example, the virtual object 710 may exist in the first virtual environment mode, but not in the second virtual environment mode. The virtual object 710 may be associated with a first size in the first virtual environment mode and associated with a second size in the second virtual environment mode.

The environment structure class node 714 may define the structure and appearance of the virtual environment view 706, the virtual object 710, functions, and/or operations associated therewith. Similarly to the view class node 712, the nodes of the environment structure class node 714 may define or calculate the structure based on the virtual environment mode as an argument. In this regard, the geometry node may be used to define shapes associated with the virtual object 710 based on the virtual environment mode. The appearance node may be used to define visible properties, such as texture and material based on the virtual environment mode. The terrain node may be used to define aspects of a terrain and a landscape based on the virtual environment mode, as shown in FIGS. 8-11. The collision node may define which objects in a virtual environment view 706 are associated with collision states (e.g., whether another virtual object may pass through that virtual object without colliding with the virtual object), based on the virtual environment mode. Again, the virtual environment mode may be associated with different devices 124 and determined based on the demographics of the user, the account associated with the user, the hardware of the device 124 or the hardware of the virtual reality headset.

The eventsIn class node 716 may include a function defining one or more triggers for the eventsOut class node 718. For example, the receipt of a tap of an CA' button may trigger an output event. The eventsIn class node 716 defines the types and names of events that each node may receive (e.g., triggers) or generate. For example, the EventManager node may define custom events and include event handlers and listeners that determine event triggers (e.g., determined from user data, user input data, or vehicle data) to initialize or trigger specific events. The type field defines a type of the event, the node field defines which node(s) the event applies to and the set_fieldname method may be used to modify a value of a field during the event. The eventsOut class node 718 may manage execution and routing of the event. The fieldname_changed field indicates what field(s) are changed during the event, the type field defines the type of the event, the node field may define which node the event applies to, and the route method defines how the event is sent to a node and how the event is received and generated by a node. Although not illustrated in the embodiment of FIG. 7, the other class nodes 716 and 718 may receive the virtual environment mode as an argument similarly to the view class node 712 and the environment structure class node 714.

The class nodes and/or associated functions or nodes may be stored on the database 108 of FIG. 2. Thus, these nodes or functions may generate the first virtual environment view or the second virtual environment view based on the virtual environment mode being the first virtual environment mode or the second virtual environment mode, respectively. According to one or more aspects, the virtual environment mode may be of a numerical datatype (e.g., mode 1, mode 2, mode 3, etc.) or have its own datatype (e.g., the virtual environment mode datatype).

The class nodes and components may be augmented according to at least one of the vehicle data and the user data to generate a dynamic virtual environment 702 and/or virtual environment views 706 for the user 312. According to one or more aspects, the vehicle data 612, 614, 616 and the user data 613, 620 may be used to initialize nodes, set properties and fields, and initialize or define events.

FIG. 8 is an exemplary first virtual environment view 800, according to one or more aspects. FIG. 9 is an exemplary second virtual environment view 900 corresponding to the first virtual environment view 800 of FIG. 8, according to one or more aspects.

In FIG. 8, the first virtual environment view includes a first person perspective or view for a first user 802 according to a first virtual environment mode. The first user's first virtual environment view includes another user or a second user 804. Here, in this example, the first user 802 may see, through the first virtual environment view, that the second user 804 is interacting with a virtual object, rendered as a dragon 806 (e.g., a non-playable character). For example, here, the second user 804 appears to be fighting the dragon 806. The first virtual environment view of the virtual environment may include other virtual objects, such as a castle 810. The virtual object of the castle 810 is associated with virtual object properties, including size, shape, length, height 812, width 814, etc., which may be defined by one or more nodes or functions of a class node 704.

Further, the first virtual environment view may include other virtual objects, such as a sword 820, a wall 830, a tree 840, etc. Additionally, the first virtual environment view may include virtual environment features, such as grass 862, a brick road 864, and a path 866, for example. One or more of the virtual objects or virtual environment features may have a one-to-one correspondence with virtual objects or virtual environment features associated with the second virtual environment view, such as the second virtual environment view 900 of FIG. 9.

In FIG. 9, the second virtual environment view 900 includes a first person perspective or view for the first user 902 according to a second virtual environment mode. The second virtual environment view includes both the first user 902 and the second user 904. In FIG. 9, the first user 902 may see, through the second virtual environment view, that the second user 904 is interacting with a virtual object, rendered as a pony 906 (e.g., a non-playable character). Here, in this example, the second user 904 appears to be petting the pony 906. The second virtual environment view of the virtual environment may include other virtual objects, such as a house 910. The virtual object of the house 910 is associated with virtual object properties, including size, shape, length, height 912, width 914, etc., which may be defined by one or more nodes or functions of a class node.

Although the coordinates of the house 910 of FIG. 9 correspond with the coordinates of the castle 810 of FIG. 8, the width 914 of the house 910 may be different than the width 814 of the castle 810, and the height 912 of the house 910 may be different than the height 812 of the castle 810. However, the virtual environment coordinates associated with a center (e.g., center of mass, midpoint, or lateral center) may be the same for both the castle 810 and the house 910. In this way, virtual objects may be perceived differently between different virtual environment modes (e.g., the same virtual object of FIGS. 8-9 is associated with a first size in the first virtual environment mode and a second size in the second virtual environment mode).

The second virtual environment view 900 may include other virtual objects, such as a wand 920, the wall 830, and a tree 940 rendered differently than the tree 840 of FIG. 8. The second virtual environment view 900 may include a barn 950 and grass at 960 which are non-existent or have no corresponding renderings in the first virtual environment view 800 of FIG. 8 due to collision functions associated with the class nodes interpreting the first and second virtual environment modes differently. Additionally, the second virtual environment view may include virtual environment features of the virtual environment, such as grass 962, a dirt road 964, and a path 966, and may correspond to the grass 862, brick road 864, and path 866 of FIG. 8. One or more of the virtual objects or virtual environment features may have a one-to-one correspondence with virtual objects or virtual environment features associated with the first virtual environment view, such as the first virtual environment view of FIG. 8.

While some of the virtual objects are associated with matching properties, functions, nodes, etc. or otherwise have some one-to-one correspondence between the first and second virtual environment modes, other virtual objects may not necessarily have the same relationship between different virtual environment modes. For example, the sword 820 of FIG. 8 and the wand 920 of FIG. 9 may have the same movement pattern or animation function, size properties, etc. Conversely, the barn 950 of FIG. 9 may be invisible and have be non-collidable in FIG. 8, based on the virtual environment mode as an argument to one or more of the functions of the class nodes. As already discussed, the castle 810 of FIG. 8 and the house 910 of FIG. 9 may have differing size properties or characteristics. Further, other virtual objects may appear identical between the first virtual environment mode and the second virtual environment mode. For example, the wall 830 appears the same and is rendered identically and in the same position across the two different virtual environment modes of FIGS. 8-9.

The virtual environment model 310 may include one or more virtual objects, which may be rendered according to the first virtual environment view (e.g., associated with the first virtual environment mode) as the first user 802, the second user 804, the dragon 806, the castle 810, the sword 820, the wall 830, and the tree 840, which each have their own virtual environment coordinates within the virtual environment. The same virtual objects may be rendered according to the second virtual environment view (e.g., associated with the second virtual environment mode) as the first user 902, the second user 904, the pony 906, the house 910, the wand 920, the wall 830, and the tree 940, respectively, and have identical or corresponding virtual environment coordinates.

According to one or more aspects, the first set of functions has a one-to-one trigger correspondence with the second set of functions. In other words, receipt of an input from the user or a first user input may cause or trigger corresponding functions to execute. For example, the database 108 may store the virtual environment model 310 associated with the depicted virtual environments of FIGS. 8-9. Taking the dragon 806 of FIG. 8 and the pony 906 of FIG. 9 to be the first virtual object in this example, the dragon 806 of FIG. 8 may be associated with a first function, while the same first virtual object represented as the pony 906 of FIG. 9 may be associated with a second function. For example, the first function and the second function may be idle behavior functions which dictate the movement, animation, appearance, texture, etc. of the first virtual object as the dragon 806 or the pony 906.

In FIG. 8, where the first user 802 is associated with the first virtual environment mode, the dynamic virtual environment module 306 of the virtual environment engine 116 of the processor 104 may generate the first virtual environment view to include a scene where the dragon 806 wanders around a range or within a predefined perimeter (not shown) and breathes fire, burning the grass 862 within the virtual environment. Correspondingly, in FIG. 9, where the first user 902 is associated with the second virtual environment mode, the dynamic virtual environment module 306 of the virtual environment engine 116 of the processor 104 may generate the second virtual environment view to include a scene where the pony 906 wanders around the range or within the predefined perimeter (not shown) and eats the grass 962 within the virtual environment.

In this way, the first function associated with the first virtual environment mode and the second function associated with the second virtual environment mode may correspond to one another (e.g., because the two functions share the predefined perimeter as a variable and relate to controlling the aspect of idle behavior of the first virtual object either as the dragon 806 or the pony 906). In this regard, the first set of functions or the first function may have a one-to-one argument correspondence with the second set of functions or the second function. For example, the first function and the second function may both receive the same number of arguments, have the same number of inputs and outputs, where the arguments have the same datatypes, etc.

According to one or more aspects, the first set of functions or the first function has a one-to-one animation correspondence with the second set of functions or the second function. For example, upon receiving a first input from the first user associated with the first virtual environment mode or the same type of user data, the dynamic virtual environment module 306 of the virtual environment engine 116 of the processor 104 may generate the first virtual environment view (which is associated with the first virtual environment mode and the smartphone 224*a*) to include a scene where the first user slashes the sword 820. Conversely or correspondingly, upon receiving the same type of first input from the first user, the dynamic virtual environment module 306 of the virtual environment engine 116 of the processor 104 may generate the second virtual environment view (which is associated with the second virtual environment mode and the tablet 224*b*) to include a scene where the first user waves the wand 920. According to one or more aspects, class nodes and nodes of the class nodes may utilize the same variables as inputs, perform corresponding calculations or generate corresponding views which may include partially identical features and/or partially different features.

For example, in the sword 820 slashing and wand waving scenario described above, the sword 820 and the wand 920 may have identical geometries, behaviors, or animations (e.g., movement or motions) but different texture or appearances, according to one or more aspects. As such, the user 802 associated with the first virtual environment mode and the user 902 associated with the second virtual environment mode may see the sword 820 and the wand 920 as virtual objects with the same dimensions or same size, and moved using the same movement patterns.

According to one or more aspects, the animation function or node of the behavior node of the view class node 712 may execute a number of sword slashings or wand wavings based on the virtual environment mode. For example, the wand waving may occur merely two times while the sword slashing may occur three times based on the different virtual environment modes. In yet other embodiments, the functions, nodes, etc. may be executed differently based on a level associated with the character. For example, a level ten warrior 802 may slash his or her sword 820 ten times, while a level three warrior 802 may merely slash his or her sword 820 three times.

Because the appearance node (e.g., with reference to FIG. 7) may generate different texture or material properties for the sword 820 and the wand 920, one may appear shiny, while the other may appear dark and matte. Further, an audio effect node (not shown in FIG. 7) may generate differing audio effects (e.g., a slashing sound for the sword 820 and a magic wand sound effect for the wand 920).

According to one or more aspects, users may be rewarded and/or a score may be tracked or tallied for interactions or interacting with the virtual objects of the virtual environment. For example, if the user 802 of FIG. 8 attacks (e.g., performs the first function associated with the first virtual environment mode) the dragon 806, the virtual environment engine 116 may provide the user 802 with a reward (e.g., credit points to the associated user account, etc.). Based on the one-to-one correspondence between the first function and the second function, if the user 902 of FIG. 9 waves (e.g., performs the second function associated with the second virtual environment mode) at the pony 906 using the wand 920, the virtual environment engine 116 may provide the user 902 of FIG. 9 with a similar or corresponding reward (e.g., credit points to the associated user account, etc.).

Figure 10:
FIG. 10 is another exemplary first virtual environment view, according to one or more aspects.
Figure 11:
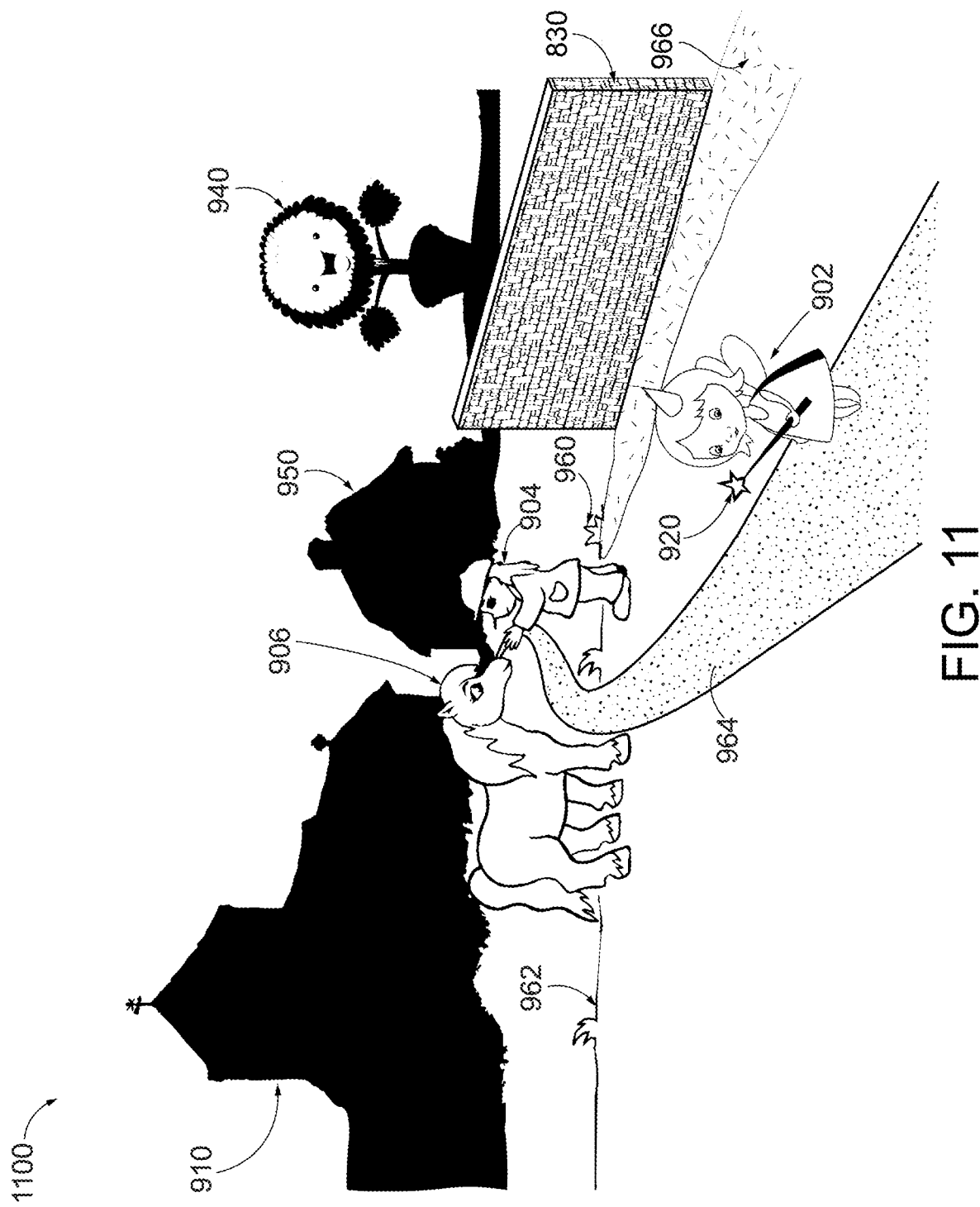
FIG. 11 is another exemplary second virtual environment view corresponding to the first virtual environment view of FIG. 10, according to one or more aspects.

FIG. 10 is another exemplary first virtual environment view 1000, according to one or more aspects. FIG. 11 is another exemplary second virtual environment view 1100 corresponding to the first virtual environment view 1000 of FIG. 10, according to one or more aspects. FIGS. 10-11 will be described with reference to one another because the second virtual environment view of FIG. 11 corresponds to the first virtual environment view of FIG. 10.

As seen in FIG. 10, there are two users 802 and 804 (e.g., a type of virtual object) illustrated in the exemplary first virtual environment view—a first user 802 and a second user 804. In this first virtual environment view based on the first virtual environment mode, a first rendering of the first virtual environment view is presented to a third user (not shown), and the first user 802 is rendered with a first skin.

In FIG. 11, the same two users 902 and 904 are present. In this second virtual environment view, a second rendering of the second virtual environment view is presented to a fourth user (not shown), and the first user 902 is rendered with a second skin. In other words, because the second virtual environment view is selected based on the second virtual environment mode, the first user 902 and the second user 904 of FIG. 11 are rendered differently and are associated with different sets of functions. For example, the first user 802 may be associated with a first dialogue function in FIG. 10 and the first user 902 may be associated with a second dialogue function in FIG. 11.

In other words, when the third user provides an input directed to the first user 802 of FIG. 10, the first dialogue function may be executed, thereby presenting the third user with a first set of dialogue. Conversely, when the fourth user provides the same or corresponding input directed to the first user 902 of FIG. 11, the second dialogue function may be executed, thereby presenting the fourth user with a second set of dialogue. In this way, the virtual environment engine 116 may utilize the nodes of the class nodes (e.g., Behavior, Geometry, and Appearance) to enable the users to interact with one another but perceive their interactions differently via different skins or different perspectives. Not all of the functions or nodes of the class nodes are required to have the one-to-one correspondence described above. For example, according to one aspect, the first dialogue may merely include a text rendering and/or audio while the second dialogue may include a corresponding text rendering, audio, and an animation, such as of the user handing over a virtual object of a flower.

Despite the third user of FIG. 10 being associated with the first virtual environment mode and the fourth user of FIG. 11 being associated with the second virtual environment mode, the third user of FIG. 10 may interact with the fourth user of FIG. 11. In other words, users may interact with one another in the common virtual environment, but perceive virtual objects within the virtual environment differently and have different interactions based on their associated virtual environment mode.

In this regard, FIG. 10 is an exemplary illustration of a scenario where the third user is experiencing the virtual environment according to the first mode and FIG. 11 is an exemplary illustration of a scenario where the fourth user is experiencing the virtual environment according to the second mode with all things being the same (e.g., position, coordinates, bearing of the users, inputs provided from the respective user) except the virtual environment mode being in a first mode (e.g., first mode) for FIG. 10 and in a second mode (e.g., second mode) for FIG. 11.

Thus, the virtual environment engine 116 of the processor 104, using the view class node 712, may generate the first virtual environment view of the first user as the warrior 804 carrying the sword 820 for the third user (e.g., associated with the first virtual environment mode) while generating the second virtual environment view of the first user (e.g., associated with the second virtual environment mode) as the princess 904 carrying the wand 920 for the fourth user. Because the nodes or functions associated with the view class node 712 and the environment structure class node 714 are provided with the virtual environment mode of the corresponding user as arguments (as discussed with reference to FIG. 7), the functions or nodes, such as, for example, Transform, ImageEffect, Behavior, VisualEffects, geometry, and appearance, may enable the virtual environment engine 116 to render or generate the virtual objects of FIGS. 10-11 differently (and to have different animations, reactions, triggers, EventsIn, or EventsOut) for the third and fourth users.

Explained yet another way, the same first user of FIGS. 10-11 may be perceived, rendered, or viewed differently by another (e.g., the third user may perceive the first user as a male and the fourth user perceives the first user as a female) user based on the virtual environment mode associated with that user, which may be determined or selected based on selections made by that user which are not necessarily related directly to selection of a game skin. Thus, two different virtual environment perspectives (and thus games) of the same or common virtual environment may be created or generated by the virtual environment engine 116 based on the virtual environment mode.

Figure 12:
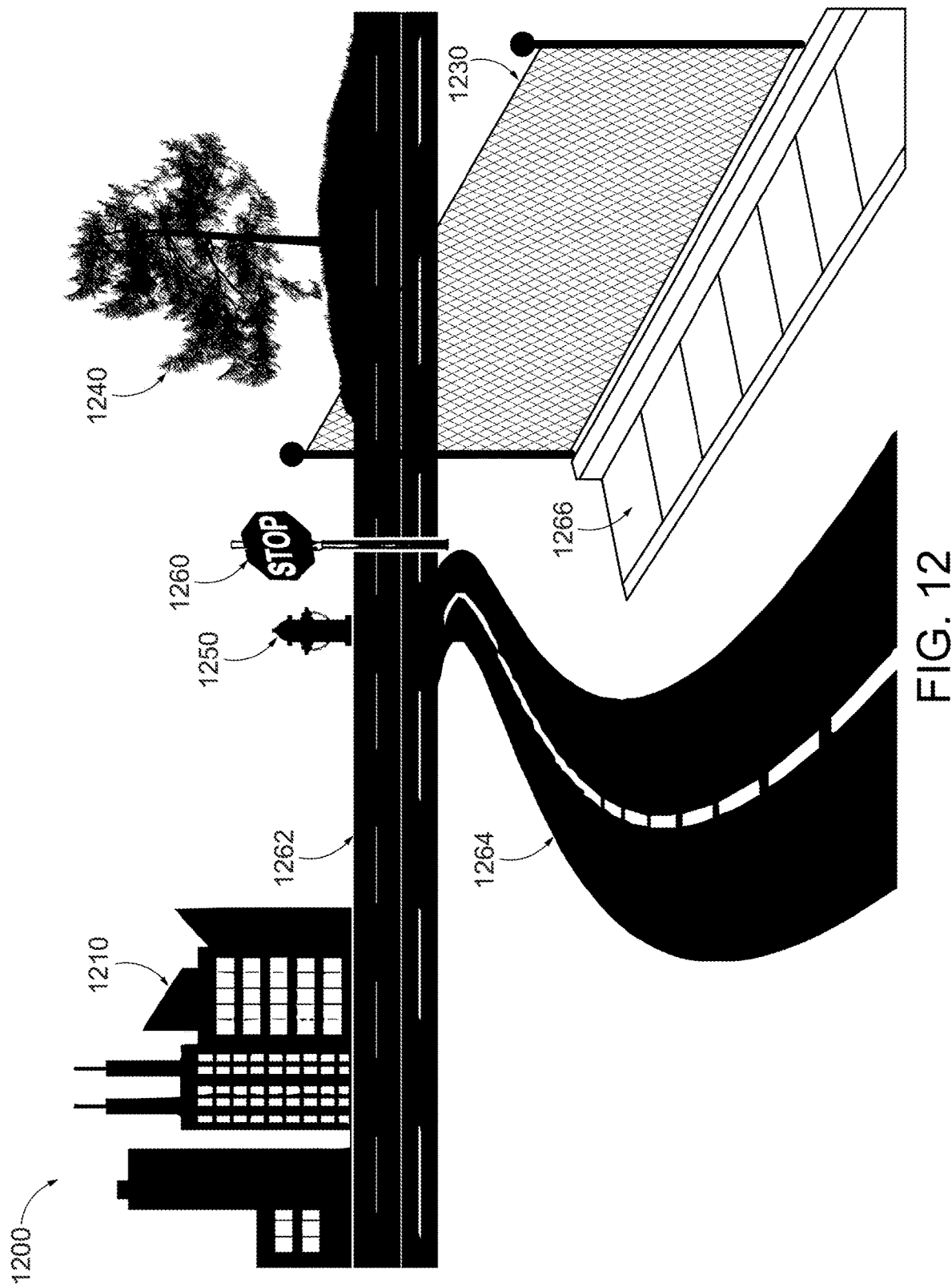
FIG. 12 is an exemplary view of a real world environment from which a virtual environment view may be based thereon, according to one or more aspects.

FIG. 12 is an exemplary view of a real world environment 1200 from which a virtual environment view may be based thereon, according to one or more aspects. The real world environment may include a building 1210, a fence 1230, a tree 1240, a fire hydrant 1250, a stop sign 1260, a first road 1262, a second road 1264, and a sidewalk 1266. As previously discussed, the vehicle sensors 120 of the system 100 may gather, sense, or detect data from the real world environment and feed this data to the virtual environment model 310 stored on the database 108. In this way, the vehicle sensors 120 may sense or detect features from the real world environment which may be used to generate or mirror aspects within the virtual environment associated with the virtual environment model 310.

In the example of FIG. 12, the building 1210 may correspond to the virtual object of the castle 810 or the house 910, depending on the virtual environment mode. Similarly, the fence 1230 may correspond to the virtual object of the wall 830, which in the example described herein, does not change based on the virtual environment mode. The tree 1240 may correspond to the virtual object rendered as the trees 840 and 940 of FIGS. 8-9 based on the virtual environment mode. Similarly, the roads and sidewalk 1262, 1264, and 1266 may correspond to features of the virtual environment as 862, 864, and 866 or 962, 964, and 966 of FIGS. 8-9 depending on the virtual environment mode. Other elements, such as the fire hydrant 1250 and the stop sign 1260 may appear in merely one of (e.g., the second) the virtual environment modes (e.g., as the barn 950 and the grass 960) and not the other (e.g., the first) virtual environment mode. In this example, the correspondence relates to the virtual environment coordinates or the spatial relationships between elements of the real world environment and virtual environment.

Therefore, an in-vehicle virtual environment experience where multiple players (e.g., users) may play a virtual environment game is provided and different perspectives or different virtual worlds are generated by the virtual environment engine 116 using the same virtual environment model 310 and/or virtual environment coordinates.

Figure 13:
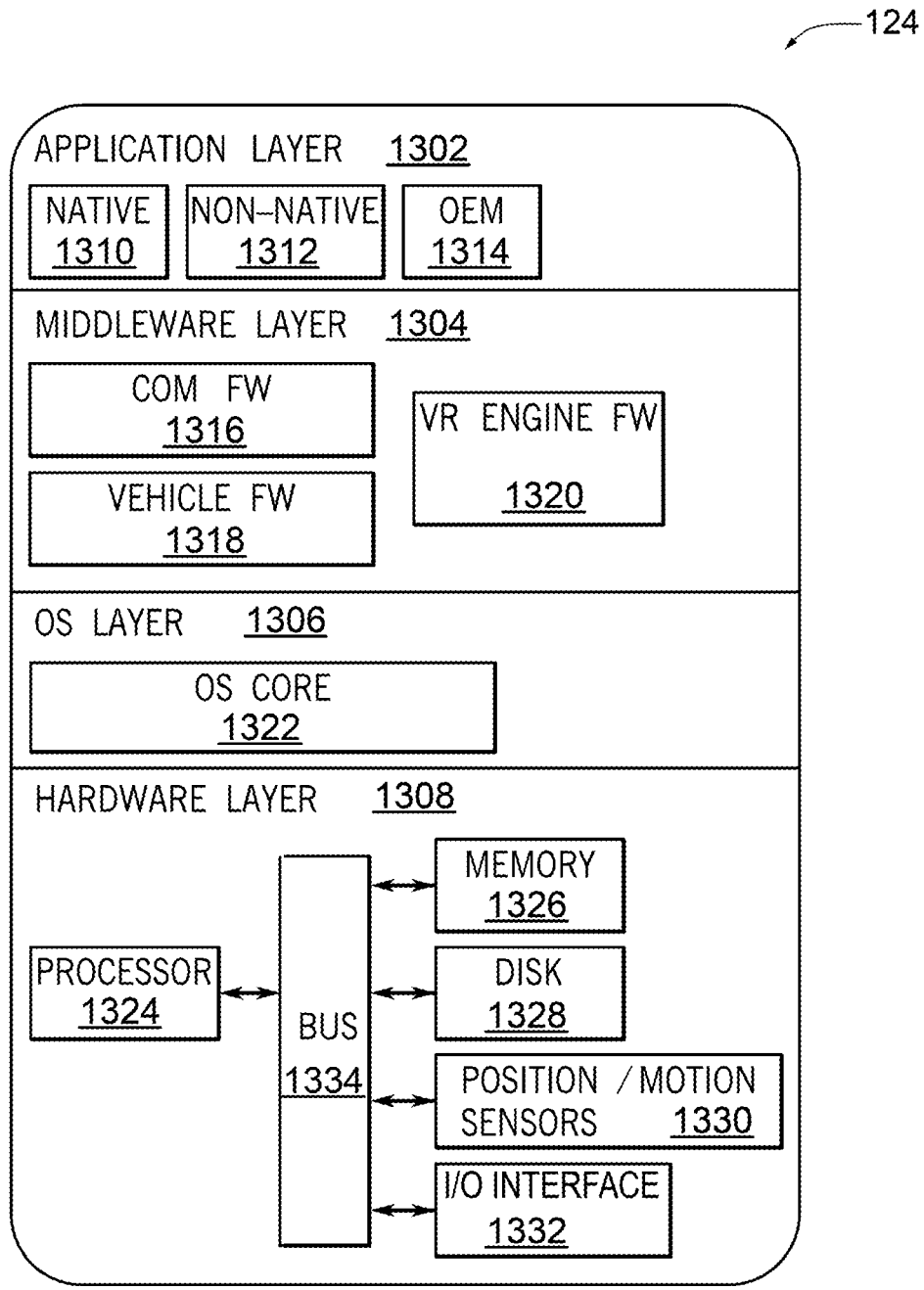
FIG. 13 is a schematic view of an exemplary system architecture implementing the virtual environment system described herein, according to one or more aspects.

FIG. 13 is a schematic view of an exemplary system architecture implementing the virtual environment system described herein, according to one or more aspects. For example, the device 124 of FIG. 13 may be the virtual reality headset 224c of FIG. 2. According to one or more aspects, the virtual reality headset 224c may include the virtual environment engine 1320, which renders the virtual environment view of the virtual object based on the virtual environment mode. According to one or more aspects, the virtual environment engine 1320 of FIG. 13 may perform at least some of the functions or calculations of the virtual environment engine of FIGS. 1-3, described above.

In FIG. 13, the device 124 includes an application layer 1302, a middleware layer 1304, an operating system (OS) layer 1306, and a hardware layer 1308. An exemplary OS layer 1306 may be an Android OS. It is understood that other operating systems may be implemented. Further, it is understood that one or more of the components of FIG. 13 may be combined, omitted, or organized into different architectures. For example, the application layer 1302 may include components of the OS application layer.

The application layer 1302 may include native applications 1310, non-native applications 1312 (e.g., third party) and original equipment manufacturer (OEM) applications 1314, which run on the device 124. The native applications 1310 are locally installed and designed by the manufacturer of the device 124 to run on the device operating system (e.g., Android). For example, native applications 1310 may include applications a contacts application, a phone application, and a browser application. Non-native applications 1312 include applications provided by third-parties. OEM applications 1314 include applications provided by a vehicle OEM for interaction with the vehicle (not shown) and the device 124. The OEM applications 1314 may be associated with a Graphic User Interface (GUI) for launching OEM applications 1314 on the device 124 provided by an OEM server (e.g., connected to, for example, the network 122 of FIG. 1).

The middleware layer 1304 may include libraries, frameworks, and application programming interfaces (API) for operating the device 124 and applications on the device 124. For example, the communication framework (com FW) 1316 includes provisions for connectivity and communication with external servers and device and application authentication. The vehicle framework (vehicle FW) 1318 is a specific framework for communicating with a vehicle (e.g., the vehicle 200 of FIG. 2), handling vehicle data exchange (e.g., with, for example, the vehicle systems 118 and/or the vehicle sensors 120 of FIG. 1) and providing touch panel events between the device 124 and the computing device 102 of FIG. 1. The virtual environment engine framework (virtual environment engine FW) 1320 is a framework for facilitating dynamic in-vehicle virtual environment experiences. For example, in one or more embodiments the virtual environment engine FW 1320 communicates with the virtual environment engine 116 of FIG. 1. In other embodiments, the virtual environment engine FW 1320 may include or perform the functions of the virtual environment engine 116 (e.g., the virtual environment data module 302, the dynamic virtual environment module 306, or the rendering module 308 of FIG. 3).

The OS layer 1306 generally provides services for managing hardware and software resources of the device 124 and includes an OS Core 1322. The OS Core 1322 may be, for example, Android, iOS, Mobile Linux, Symbian OS, Windows Mobile, BlackBerry OS, Web OS, or other operating systems.

Further, the hardware layer 1308 may include provisions for direct management and access of hardware resources. The device 124 may include hardware such as a processor 1324, a memory 1326, a disk 1328, position and motion sensors 1330, input/output devices 1332 (e.g., a touch screen of the device 124, a keyboard of the device 124, and a microphone of the device 124. The components of the hardware layer 1308 may communicate with one another via, for example, a bus 1334. The device 124 may include the same or similar components as the computing device 102 of FIG. 1. Thus, According to one or more aspects, the device 124, specifically the components of the hardware layer 1308, may carry out one or more the functions described with reference to the virtual environment engine 116 of FIG. 1. For example, the memory 1326 may store one or more instructions and the processor 1324 or the virtual environment engine 1320 thereof may execute one or more of the instructions stored on the memory 1324 to perform the generating of the virtual environment views described herein. In other embodiments, the virtual environment engine 1320 may execute one or more of the instructions stored on the memory 106 of the system 100 to perform the generating of the virtual environment views.

The position and motion sensors 1330 may include hardware and or software based sensors. For example, the motion sensors may include a hardware-based accelerometer, gyroscope, magnetometer, among others. The motion sensors may also include software-based gravity, linear acceleration, and rotation vector sensors. According to one or more aspects, the software-based sensors may derive data from the accelerometer and the magnetometer. In other embodiments, the software-based sensors may use the gyroscope to derive this data. The motion sensors are useful for monitoring device movement, such as tilt, shake, rotation, or swing. The movement may be a reflection of direct user input, but it may also be a reflection of the physical environment in which the device 124 is sitting. For example, the device 124 may detect movement of the vehicle in which it is located and/or attached. The components of the hardware abstraction layer may derive motion data from such sensors, such as, for example, the gyro module, the acceleration module, the mag module, the rotational vector module, the linear acceleration module, and the gravity module.

Similarly, the position sensors may include a hardware-based geomagnetic field sensor and a proximity sensor. An orientation sensor may be software-based and may derive its data from an accelerometer and/or the geomagnetic field sensor, gyroscope, magnetometer, among others. Position sensors are useful for determining the device 124 physical position in the world's frame of reference or in another frame of reference, for example, a vehicle frame of reference (e.g., a motion frame of reference of the vehicle). In another embodiment, the orientation sensor (or similar sensor-based orientation methods) may be used to determine the device 124 position in an application's frame of reference.

It is understood that the device 124 may also include other sensors, for example environment sensors (e.g., humidity, luminance, ambient pressure, and ambient temperature). Further, in additional embodiments, a camera (not shown) of the device 124 may be used as a sensor to detect motion, position, gesture recognition, among others, from image data acquired by the camera. The position and motion sensors 1330 may gather and obtain vehicle data, including vehicle dynamics data, independently from the vehicle systems 118 and sensors 120, by using the position and motion sensors 1330.

With respect to FIG. 2, the smartphone 224*a* may render the first virtual environment view of the virtual object based on the first virtual environment mode and the tablet 224*b* may render the second virtual environment view of the virtual object based on the second virtual environment mode. The first virtual environment view is rendered by the smartphone 224*a* and the second virtual environment view is rendered by the tablet 224*b* in a concurrent or simultaneous fashion such that the same or common virtual object is contained or included within the first virtual environment view and the second virtual environment view.

The virtual object is rendered as a first object in the first virtual environment view and the virtual object is rendered as a second object in the second virtual environment view different than the first object. Examples of this may be seen in FIGS. 8 and 10 and FIGS. 9 and 11, as previously discussed. For the sake of discussion, the virtual object of the dragon 806 in FIG. 8 and the virtual object of the pony 906 in FIG. 9 are represented as the same or as a single virtual object in the virtual environment model 310 stored on the database 108 of FIG. 2. However, because the user 802 of FIG. 8 is associated with the first mode and the user 902 of FIG. 9 is associated with the second mode, this virtual object is rendered as the first object (e.g., the dragon 806) in the first virtual environment view and rendered as the second object (e.g., the pony 906) in the second virtual environment view.

The I/O interface 1332 of the device 124 may include an I/O device, such as a controller. The controller may be a game controller, with one or more buttons, joysticks, motion sensors, etc. In any event, the I/O interface 1332 of the device 124 may receive one or more inputs from the I/O device or the controller, such as user input. For example, the controller may include an 'A' button, a 'B' button, an 'X' button, and a 'Y' button. As another example, the I/O interface 1332 of the device 124 may receive a first input, a second input, a third input, a fourth input, etc. As such, with reference to FIG. 2, the smartphone 224*a* may be associated with a first input and a second input. Similarly, the tablet 224*b* may be associated with a first input and a second input. When the respective devices receive the first input (e.g., pressing of the 'A' button), a corresponding function may be triggered.

In a scenario where the first function corresponds to the first virtual environment mode and the second function corresponds to the second virtual environment mode, receipt of the first input by the I/O interface 1332 at the smartphone 224*a* triggers execution of the first function and receipt of the first input by the I/O interface 1332 at the tablet 224*b* triggers execution of the second function. For example, with reference to FIG. 8, when the first input is received, execution of the first function may cause the virtual environment engine of the processor to generate a slashing animation for the sword 820, which may be accompanied by a slashing sound effect, etc. Conversely or correspondingly, in FIG. 9, when the first input is received, execution of the second function may cause the virtual environment engine 116 of the processor 104 to generate a wand waving (e.g., sparks or sparkles may fly off of the wand 920) animation for the wand 920. According to one or more aspects, the first function and second function may have corresponding animations. For example, the waving and the slashing animations may have the same duration, movement pattern, etc. and may be based on the virtual environment mode associated with the corresponding user.

Figure 14B:
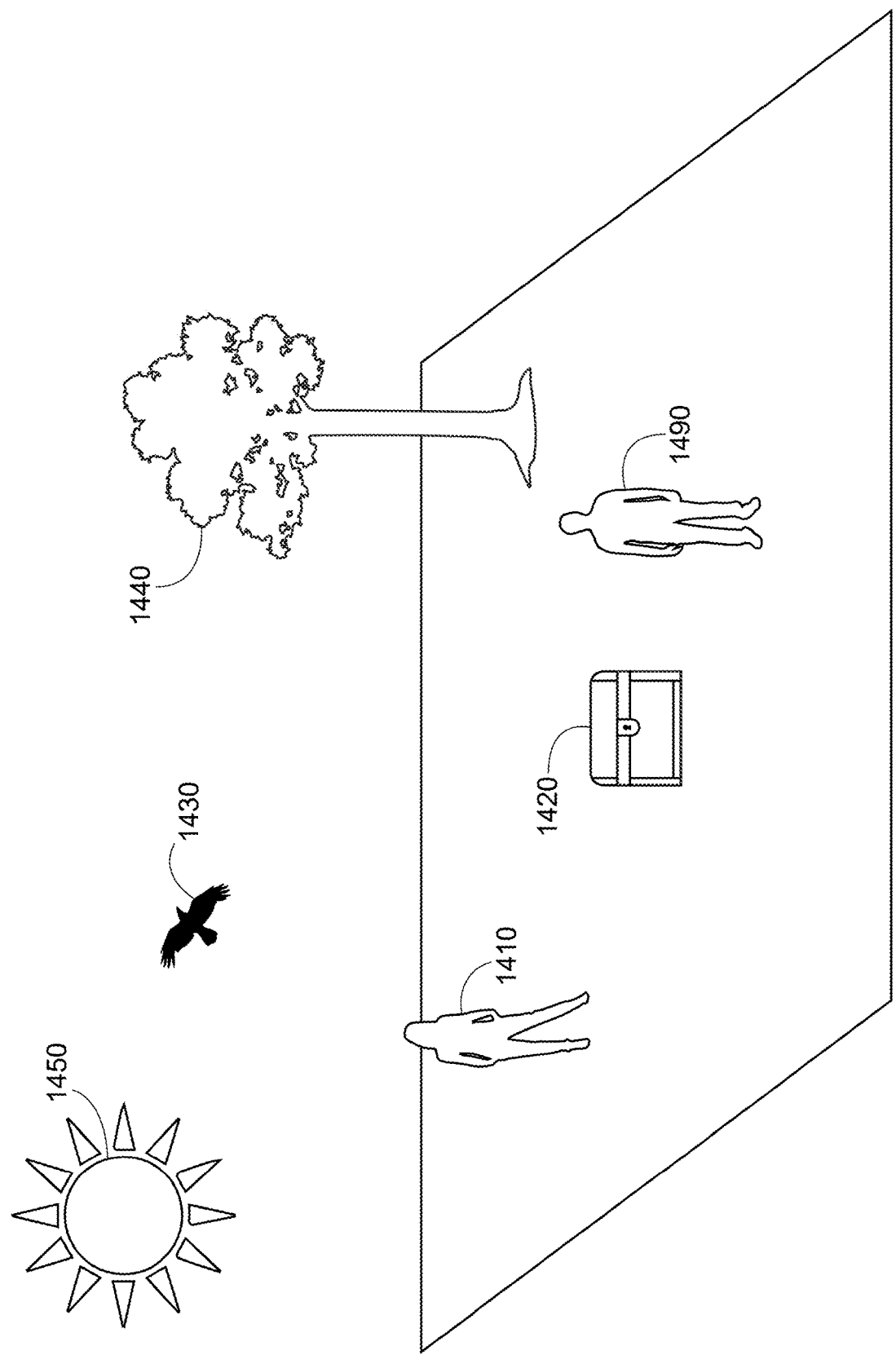

FIGS. 14A-B are exemplary first and second virtual environment views of a common virtual environment, according to one or more aspects. Additionally, the first and second virtual environment modes or views described herein may be implemented at a more abstract level than merely providing different skins. For example, with respect to FIGS. 14A-B a virtual environment may be mapped or re-mapped from 2D to 3D based on the virtual environment mode or view.

In a first virtual environment mode associated with FIG. 14A, a variety of virtual objects are rendered for a first user. The virtual objects include a first virtual user 1410, a treasure chest 1420, a bird 1430, a tree 1440, a sun 1450, and a second virtual user 1490. According to this aspect, the virtual objects 1410, 1420, 1430, 1440, 1450, and 1490 are rendered in a 2D view, based on virtual object information stored in the virtual environment model 310. In a second virtual environment mode associated with FIG. 14B, the first virtual user 1410, treasure chest 1420, bird 1430, tree 1440, sun 1450, and the second virtual user 1490 are rendered in a 3D view by the virtual environment engine 116. In this way, the virtual objects 1410, 1420, 1430, 1440, 1450, and 1490 may be rendered based on a first rendering in the first virtual environment view and rendered based on a second rendering in the second virtual environment view, which is different than the first rendering. Thus, the system 100 for providing different virtual environment perspectives based on the common virtual environment may render virtual objects differently in a manner other than merely providing different skins across different perspectives or views.

As previously discussed the first virtual environment mode may be applied to a first user experience, while the second virtual environment mode may be applied to a second user experience by the virtual environment engine 116. The virtual environment may be selected based on selections made by the user, such as selections related to game genre, a game selection, an avatar selection, ratings left for a game, previous gameplay, etc. According to one or more other aspects, the virtual environment engine 116 may associate a corresponding virtual environment with a user based on demographics of the user or based on hardware capabilities of the user's device. For example, a first user utilizing a first device with lower graphics processing power (e.g., a smartphone) may be presented with a game where the elements of the first virtual environment mode associated with FIG. 14A are presented, while a second user utilizing a second device with greater graphics processing power than the first device (e.g., a tablet) may be presented with a game where the elements of the second virtual environment mode associated with FIG. 14B are presented.

Similarly to the different dimensionalities of the renderings of FIGS. 14A-14B, the respective virtual objects may be associated with different sets of functions based on the mode associated with the experience. In other words, the virtual objects 1410, 1420, 1430, 1440, 1450, and 1490 in FIG. 14A which are associated with the first user and the first virtual environment mode may be associated with a first set of functions, while the same, corresponding virtual objects of FIG. 14B which are associated with the second user and the second virtual environment mode may be associated with a second set of functions.

The second set of functions may not necessarily correspond to the first set of functions in a 1:1 manner. For example, due to the disparity in processing power in the devices associated with FIGS. 14A-B, certain functions corresponding to the second set of functions may not be made available in within the first set of functions. Examples of this may include presentation of audio for interactions with one or more of the virtual objects 1410, 1420, 1430, 1440, 1450, and 1490, which may be presented as text or subtitles in FIG. 14A, but presented as audio and not in subtitle or text in FIG. 14B. In this way, the virtual objects 1410, 1420, 1430, 1440, 1450, and 1490 for the first set of functions has a one-to-one trigger correspondence with the second set of functions. However, the output associated with the first and sets of functions, when based on the same trigger, may result in a different user interaction experience.

Similarly, the first set of functions may have a one-to-one animation correspondence with the second set of functions even though the renderings occur in 2D and 3D for FIGS. 14A-B, respectively. However, the one-to-one correspondence between the first and second sets of functions does not necessarily mean that the code between the first and second sets of functions is identical (e.g., outputting text versus playing audio). In this way, if the user 1410 approaches the treasure chest 1420 and provides a first input, the treasure chests 1420 of FIGS. 14A-B will be rendered to open, and the contents delivered to the user 1410 or added to the user's inventory.

Figure 15A:
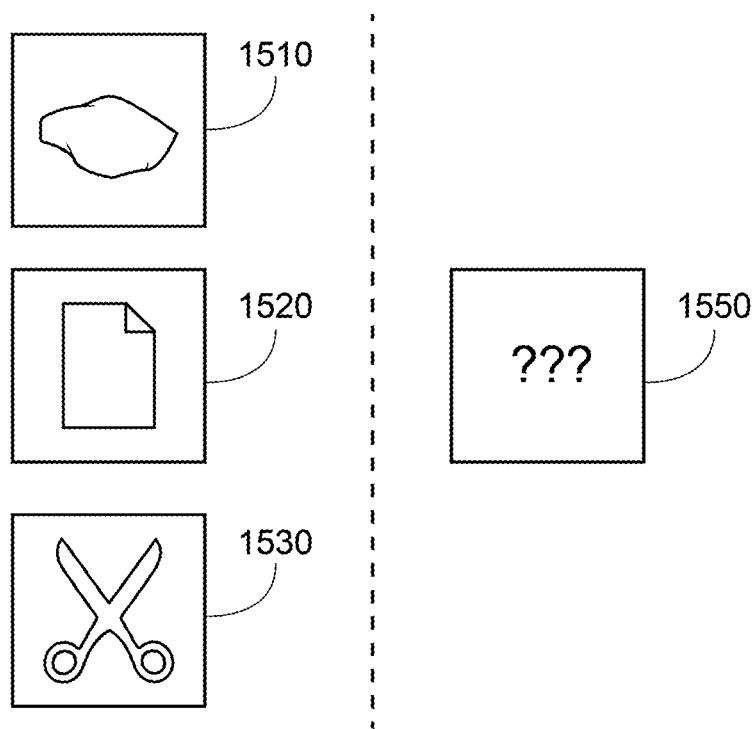
FIGS. 15A-B are exemplary first and second virtual environment views of a common virtual environment, according to one or more aspects.
Figure 15B:
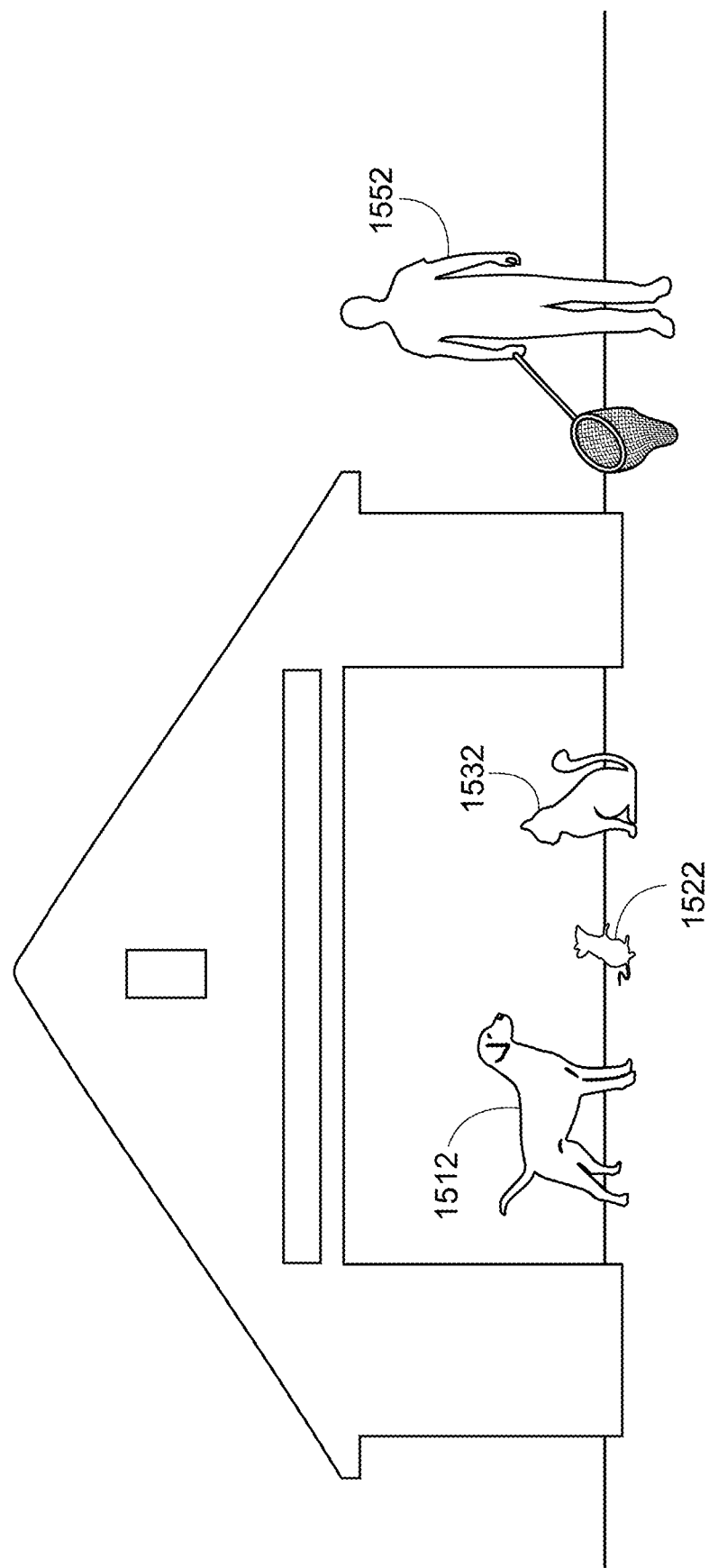

FIGS. 15A-B are exemplary first and second virtual environment views of a common virtual environment, according to one or more aspects. The virtual environment engine 116 may keep a score associated with the first game (e.g., rock, paper, and scissors) of FIG. 15A and the second game of FIG. 15B. Because the first game and the second game are based off of the common virtual environment, user selections which mirror one another between the two games. For example, assuming that paper 1520 beats rock 1510, scissors 1530 beats paper 1520, and rock 1510 beats scissors 1530 in the first game, and assuming that the dog 1512 of the second game is associated with the rock 1510, the mouse 1522 is associated with paper 1520, and the cat 1532 is associated with the scissors 1530, players or users making corresponding selections between the first and second games may be provided with identical results or scores by the virtual environment engine 116. In this way, the first game and the second game may have a 1:1 correspondence with one another, and the first and the second game are skinned differently, rather than merely skinning the virtual objects 1510, 1520, 1530, 1512, 1522, 1532 differently. Stated another way, while the virtual objects of FIGS. 15A-B are skinned differently, the decision making or choices presented to the player are also framed or rendered in a different manner (e.g., picking rock, paper, and scissors versus selection of an animal). In this regard, additional game elements may be rendered or present in one game versus another. For example, in rock, paper, and scissors, victory is defined by a state machine, as described above, while an additional element of an animal control agent 1552 is rendered in FIG. 15B. In FIG. 15A, selections of the rock, paper, and scissors are rendered for both the first user and a second user (which may be a computer player or another user). In FIG. 15B, the selection of the second player is hidden, and the result of the game is rendered differently. For example, in FIG. 15A, a victory or defeat message may be presented or rendered by the virtual environment engine 116, while the animal control agent 1552 may 'capture' the user's selection in FIG. 15B based on a losing selection, while not rendering the second user's selection (dog, cat, mouse).

Figure 16A:
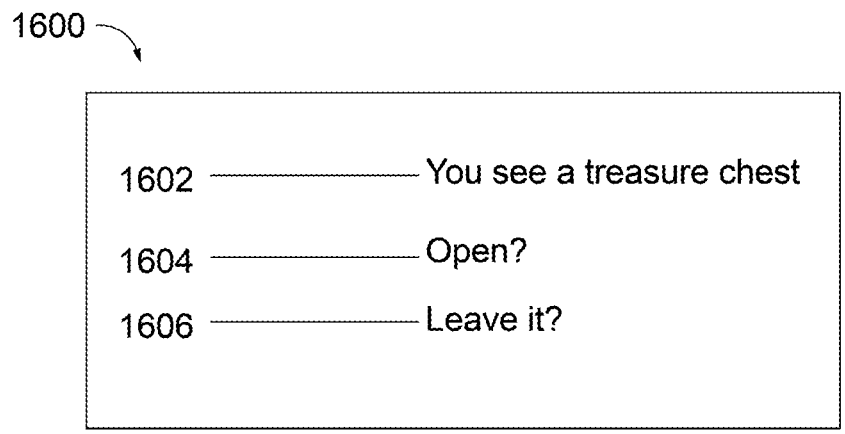
FIGS. 16A-B are exemplary first and second virtual environment views of a common virtual environment, according to one or more aspects.
Figure 16B:
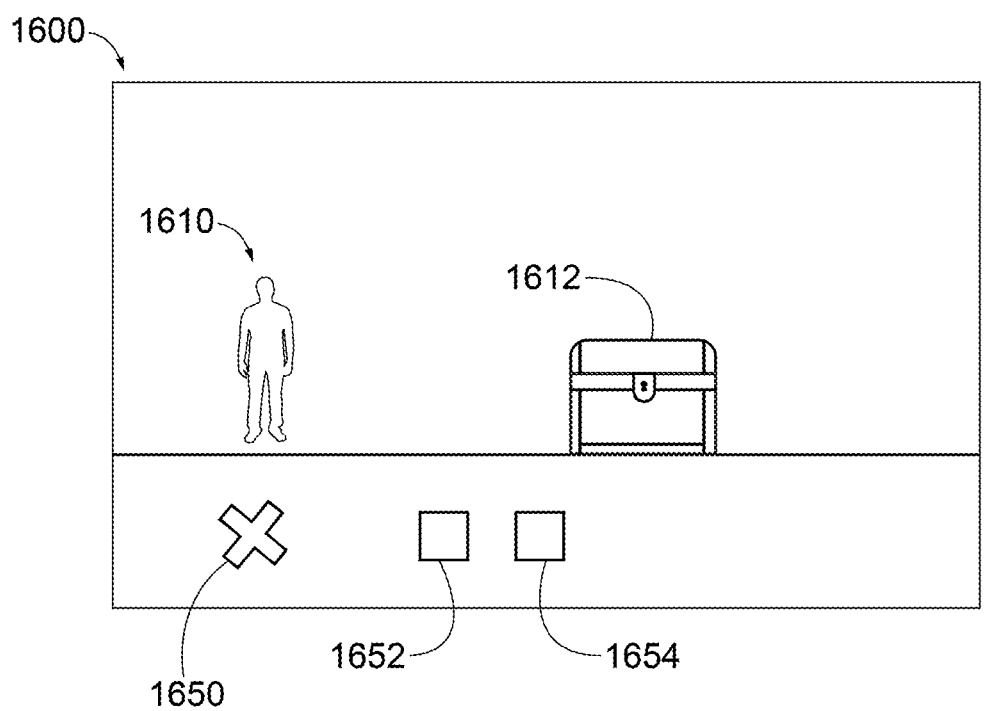

FIGS. 16A-B are exemplary first and second virtual environment views of a common virtual environment, according to one or more aspects. In FIG. 16A, a dungeon crawler game may be implemented via text prompts 1602, 1604, and 1606. In FIG. 16B, the same dungeon crawler game may be implemented via a graphical user interface (GUI), which includes virtual objects 1610 and 1612 as a user and a treasure chest, respectively. In FIG. 16A, no rendering of any virtual objects is performed, while in FIG. 16B, rendering of virtual objects is provided by the virtual environment engine 116. Further, one or more of the second sets of functions may be rendered on the GUI 1600, such as a control pad 1650, and input buttons 1652, 1654.

Figure 17:
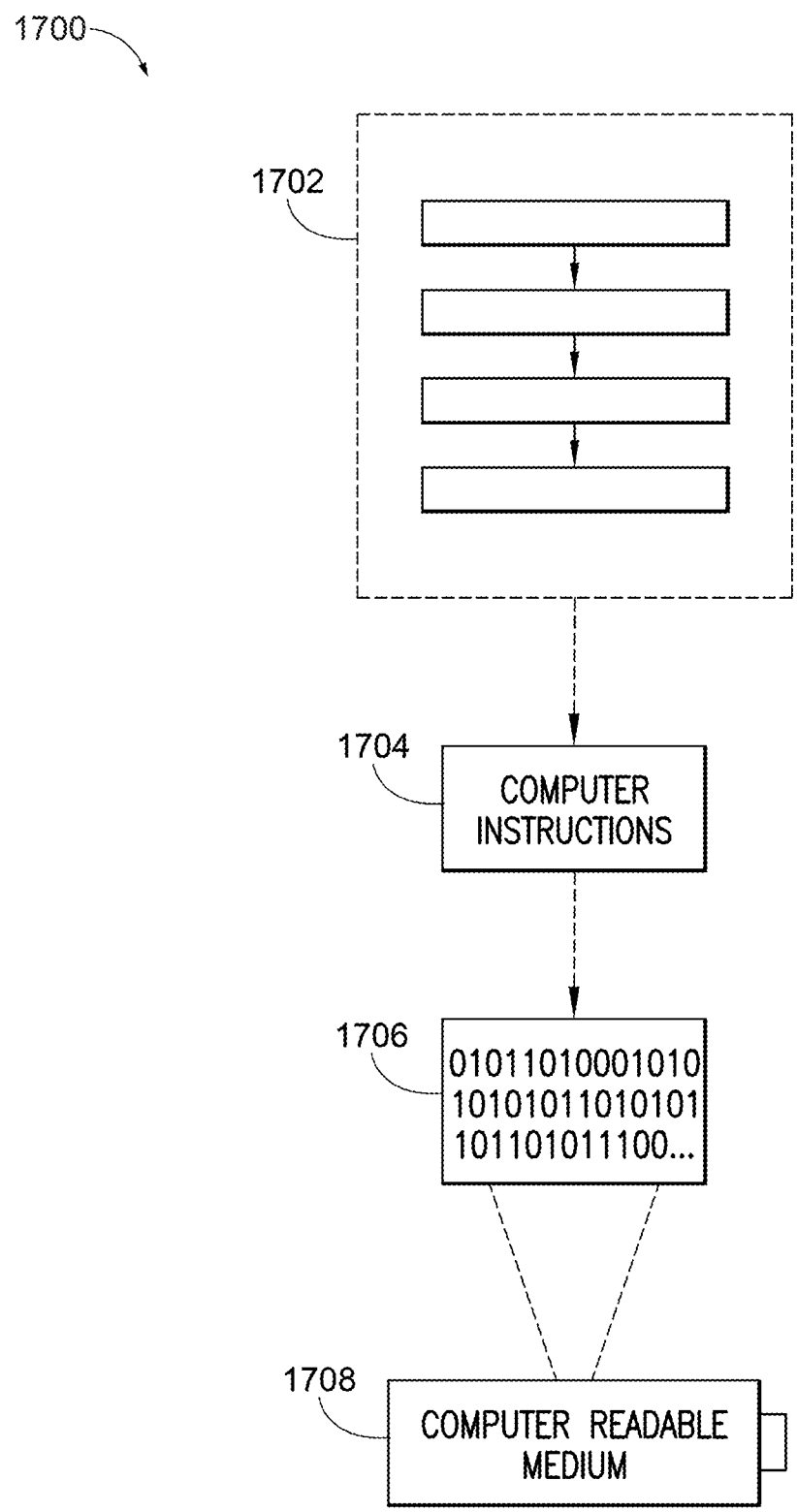
FIG. 17 is an illustration of an example computer-readable medium or computer-readable device including processor-executable instructions configured to embody one or more of the provisions set forth herein, according to one or more aspects.

Still another embodiment involves a computer-readable medium including processor-executable instructions configured to implement one or more embodiments of the techniques presented herein. An embodiment of a computer-readable medium or a computer-readable device devised in these ways is illustrated in FIG. 17, wherein an implementation 1700 includes a computer-readable medium 1708, such as a CD-R, DVD-R, flash drive, a platter of a hard disk drive, among others, on which is encoded computer-readable data 1706. This computer-readable data 1706, such as binary data including a plurality of zero's and one's as shown in 1706, in turn includes a set of processor-executable computer instructions 1704 configured to operate according to one or more of the principles set forth herein. In one such embodiment 1700, the processor-executable computer instructions 1704 may be configured to perform a method 1702, such as the method 400 of FIG. 4 or the method 500 of FIG. 5. In another embodiment, the processor-executable computer instructions 1704 may be configured to implement a system, such as the system 100 of FIGS. 1-2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 18:
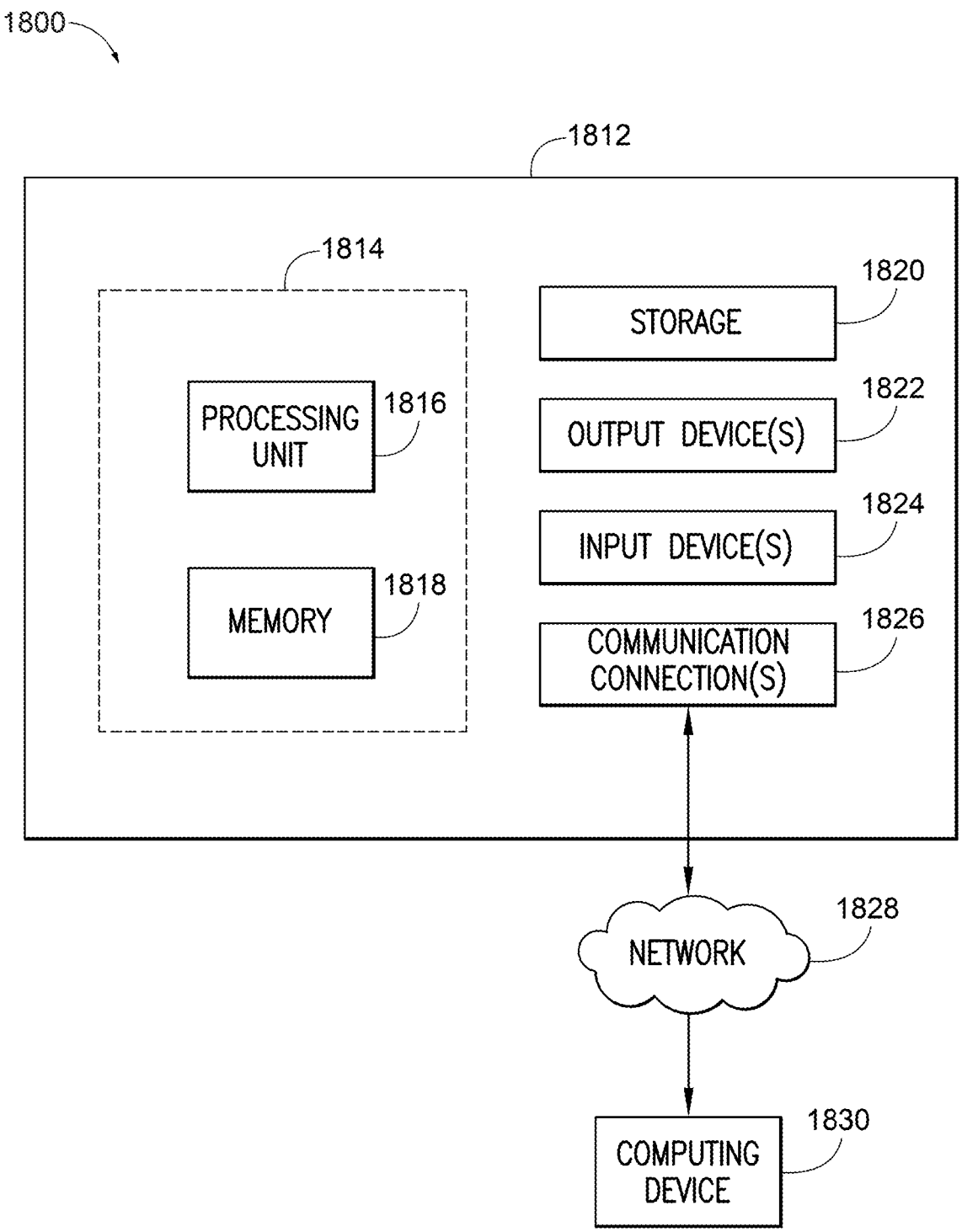
FIG. 18 is an illustration of an example computing environment where one or more of the provisions set forth herein are implemented, according to one or more aspects.

FIG. 18 and the following discussion provide a description of a suitable computing environment to implement embodiments of one or more of the provisions set forth herein. The operating environment of FIG. 18 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 18 illustrates a system 1800 including a computing device 1812 configured to implement one or more embodiments provided herein. In one configuration, computing device 1812 includes at least one processing unit 1816 and memory 1818. Depending on the exact configuration and type of computing device, memory 1818 may be volatile, such as RAM, non-volatile, such as ROM, flash memory, among others, or a combination of the two. This configuration is illustrated in FIG. 18 by dashed line 1814.

In other embodiments, computing device 1812 includes additional features or functionality. For example, computing device 1812 may include additional storage such as removable storage or non-removable storage, including, but not limited to, magnetic storage, optical storage, among others. Such additional storage is illustrated in FIG. 18 by storage 1820. According to one or more aspects, computer readable instructions to implement one or more embodiments provided herein are in storage 1820. Storage 1820 may store other computer readable instructions to implement an operating system, an application program, among others. Computer readable instructions may be loaded in memory 1818 for execution by processing unit 1816, for example. According to one or more aspect, the virtual environment engine 116 may be implemented via the processing unit 1816 and configured to execute one or more of the instructions stored on the memory 1818.

The term "computer readable media" as used herein includes computer storage media. Computer storage media includes volatile and nonvolatile, removable and non-removable media implemented in any method or technology for storage of information such as computer readable instructions or other data. Memory 1818 and storage 1820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 1812. Any such computer storage media is part of computing device 1812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 1812 includes input device(s) 1824 such as keyboard, mouse, pen, voice input device, touch input device, infrared cameras, video input devices, or any other input device. Output device(s) 1822 such as one or more displays, speakers, printers, or any other output device may be included with computing device 1812. Input device (s) 1824 and output device(s) 1822 may be connected to computing device 1812 via a wired connection, wireless connection, or any combination thereof. According to one or more aspects, an input device or an output device from another computing device may be used as input device(s) 1824 or output device(s) 1822 for computing device 1812. The computing device 1812 may include communication connection(s) 1826 to facilitate communications with one or more other devices 1830, such as through network 1828, for example.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for providing different virtual environment perspectives based on a common virtual environment, comprising:
   a database storing a virtual environment model associated with a virtual environment, including a first virtual object associated with virtual environment coordinates, a first set of functions corresponding to a first virtual environment mode, and a second set of functions corresponding to a second virtual environment mode;
   a memory storing one or more instructions; and
   a processor including a virtual environment engine executing one or more of the instructions stored on the memory to perform:
   generating a first virtual environment view of the first virtual object based on the first virtual environment mode; and
   generating a second virtual environment view of the first virtual object based on the second virtual environment mode,
   wherein the first virtual environment view and the second virtual environment view are respectively rendered concurrently on different devices, and
   wherein the first virtual object has a first rendering as a first object in the first virtual environment view and a second rendering as a second object different than the first object in the second virtual environment view different than the first rendering,
   wherein the first rendering and the second rendering are rendered from the same viewing angle within the common virtual environment relative to the first virtual object.

2. The system for providing different virtual environment perspectives based on the common virtual environment of claim 1, wherein:
   the first virtual environment view of the first virtual object is rendered on a first device; and the second virtual environment view of the first virtual object is rendered on a second device.

3. The system for providing different virtual environment perspectives based on the common virtual environment of claim 2, wherein:
the first device and the first virtual environment mode is associated with a first type of user; and
the second device and the second virtual environment mode is associated with a second type of user.

4. The system for providing different virtual environment perspectives based on the common virtual environment of claim 3, wherein the type of user is defined based on demographics associated with a user or selections made by the user associated with game genre, a selected game, a selected avatar, game ratings, previous gameplay.

5. The system for providing different virtual environment perspectives based on the common virtual environment of claim 1, wherein:
the first virtual object is a first user,
the first rendering of the first user is rendered with a first skin, and
the second rendering of the first user is rendered with a second skin.

6. The system for providing different virtual environment perspectives based on the common virtual environment of claim 5, wherein:
the first set of functions includes a first dialogue function; and
the second set of functions includes a second dialogue function.

7. The system for providing different virtual environment perspectives based on the common virtual environment of claim 1, wherein the first virtual environment mode and the second virtual environment mode are virtual environment mode datatypes.

8. The system for providing different virtual environment perspectives based on the common virtual environment of claim 7, wherein the database stores a view class node including functions for generating the first virtual environment view or the second virtual environment view based on the first virtual environment mode and the second virtual environment mode, respectively, as the virtual environment mode datatypes.

9. The system for providing different virtual environment perspectives based on the common virtual environment of claim 1, wherein the virtual environment includes a second virtual object associated with virtual environment coordinates, a first set of functions corresponding to the first virtual environment mode, and a second set of functions corresponding to the second virtual environment mode.

10. The system for providing different virtual environment perspectives based on the common virtual environment of claim 9, wherein the processor:
generates the first virtual environment view of the second virtual object based on the first virtual environment mode; and
generates the second virtual environment view of the second virtual object based on the second virtual environment mode,
wherein the first virtual environment view and the second virtual environment view of the second virtual object are respectively rendered concurrently on the different devices.

11. The system for providing different virtual environment perspectives based on the common virtual environment of claim 9, wherein the second virtual object is a non-playable character.

12. The system for providing different virtual environment perspectives based on the common virtual environment of claim 1, wherein the first set of functions has a one-to-one trigger correspondence with the second set of functions.

13. The system for providing different virtual environment perspectives based on the common virtual environment of claim 1, wherein the first set of functions has a one-to-one animation correspondence with the second set of functions.

14. The system for providing different virtual environment perspectives based on the common virtual environment of claim 1, wherein the first set of functions has a one-to-one argument correspondence with the second set of functions.

15. A system for providing different virtual environment perspectives based on a common virtual environment, comprising:
a database storing a virtual environment model associated with a virtual environment, including a virtual object associated with virtual environment coordinates, a first function corresponding to a first virtual environment mode, and a second function corresponding to a second virtual environment mode;
a memory storing one or more instructions; and
a processor including a virtual environment engine executing one or more of the instructions stored on the memory to perform:
generating a first virtual environment view of the virtual object as a first object based on a first virtual environment skin of the first virtual environment mode; and
generating a second virtual environment view of the virtual object as a second object different than the first object based on a second virtual environment skin of the second virtual environment mode different than the first virtual environment skin,
wherein the first virtual environment view and the second virtual environment view are rendered concurrently on different devices,
wherein the first virtual environment view and the second virtual environment view are rendered from the same viewing angle within the common virtual environment relative to the virtual object.

16. The system for providing different virtual environment perspectives based on the common virtual environment of claim 15,
wherein the first virtual environment skin of the first virtual environment view of the virtual object is associated with a first size; and
wherein the second virtual environment skin of the second virtual environment view of the virtual object is associated with a second size different than the first size.

17. A system for providing different virtual environment perspectives based on a common virtual environment, comprising:
a database storing a virtual environment model associated with a virtual environment, including a virtual object associated with virtual environment coordinates, a first function corresponding to a first virtual environment mode, and a second function corresponding to a second virtual environment mode;
a memory storing one or more instructions;
a first device including a virtual environment engine executing one or more of the instructions stored on the memory to perform rendering a first virtual environment view of the virtual object based on the first virtual environment mode; and
a second device including a virtual environment engine executing one or more of the instructions stored on the memory to perform rendering a second virtual environment view of the virtual object based on the second virtual environment mode, wherein the first virtual environment view and the second virtual environment view are rendered concurrently by respective devices, and wherein the virtual object is rendered as a first object in the first virtual environment view and the virtual object is rendered as a second object in the second virtual environment view different than the first object.

18. The system for providing different virtual environment perspectives based on the common virtual environment of claim 17, wherein the first device is associated with a first input and a second input; and wherein the second device is associated with a first input and a second input.

19. The system for providing different virtual environment perspectives based on the common virtual environment of claim 18, wherein receipt of the first input at the first device triggers the first function; and wherein receipt of the first input at the second device triggers the second function.

20. The system for providing different virtual environment perspectives based on the common virtual environment of claim 17, wherein the first function and second function have corresponding animations.

\* \* \* \* \*